(12) United States Patent
Numajiri

(10) Patent No.: US 8,198,749 B2
(45) Date of Patent: Jun. 12, 2012

(54) WIND TURBINE GENERATOR

(75) Inventor: Tomohiro Numajiri, Nagasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 309 days.

(21) Appl. No.: 12/514,179

(22) PCT Filed: Mar. 19, 2008

(86) PCT No.: PCT/JP2008/055119
§ 371 (c)(1),
(2), (4) Date: Jul. 1, 2009

(87) PCT Pub. No.: WO2009/054152
PCT Pub. Date: Apr. 30, 2009

(65) Prior Publication Data
US 2010/0032961 A1 Feb. 11, 2010

(30) Foreign Application Priority Data
Oct. 23, 2007 (JP) .................. 2007-275124

(51) Int. Cl.
*F03D 9/00* (2006.01)
(52) U.S. Cl. ......................................... 290/55
(58) Field of Classification Search ....... 290/55
See application file for complete search history.

(56) References Cited

U.S. PATENT DOCUMENTS

| | | | |
|---|---|---|---|
| 2,491,172 A * | 12/1949 | Forsyth | 416/32 |
| 4,871,923 A | 10/1989 | Scholz et al. | |
| 6,459,165 B1 | 10/2002 | Schoo | |
| 7,154,191 B2 * | 12/2006 | Jansen et al. | 290/55 |
| 7,259,472 B2 * | 8/2007 | Miyake et al. | 290/55 |
| 7,282,808 B2 * | 10/2007 | Shibata et al. | 290/55 |
| 7,528,497 B2 * | 5/2009 | Bertolotti | 290/55 |
| 7,538,446 B2 * | 5/2009 | Bonnet | 290/55 |
| 7,642,668 B2 * | 1/2010 | Kim et al. | 290/55 |
| 2006/0138781 A1 * | 6/2006 | Miyake et al. | 290/55 |
| 2010/0308594 A1 * | 12/2010 | Numajiri | 290/55 |
| 2011/0006537 A1 * | 1/2011 | Numajiri | 290/55 |
| 2011/0020107 A1 * | 1/2011 | Presz et al. | 415/4.1 |

FOREIGN PATENT DOCUMENTS

| | | | |
|---|---|---|---|
| AU | 2008331342 A1 * | 10/2009 | |
| JP | 61-6686 U | 1/1986 | |
| JP | 05-164037 A | 6/1993 | |
| JP | 2006-188953 A | 7/2006 | |

OTHER PUBLICATIONS

ISR for PCT/JP2008/055119 dated May 13, 2008.

* cited by examiner

*Primary Examiner* — Joseph Waks
(74) *Attorney, Agent, or Firm* — Kanesaka Berner & Partners

(57) ABSTRACT

A wind turbine generator that allows for size and weight reduction of a nacelle bedplate and that enables easier maintainability, such as device replaceability, is provided. In a wind turbine generator that generates electricity by driving a generator connected, via a drive train, to a rotor head that has wind-turbine rotor blade attached thereto and rotates together therewith, at least a part of the drive train that transmits torque from the rotor head to the generator is disposed on a front side of the rotor head opposite a nacelle.

6 Claims, 26 Drawing Sheets

WIND TURBINE GENERATOR

RELATED APPLICATIONS

The present application is based on International Application Number PCT/JP2008/055119 dated Mar. 19, 2008, and claims priority from Japanese Application Number 2007-275124 filed Oct. 23, 2007, the disclosures of which are hereby incorporated by reference herein in their entirety.

TECHNICAL FIELD

The present invention relates to wind turbine generator that generate electricity using a wind-turbine that converts natural wind energy into torque.

BACKGROUND ART

In the related art, wind turbine generators that generate electricity by utilizing wind force, which is natural energy, are known. A wind turbine generator of this type is provided with a rotor head, which is provided on a nacelle mounted on a tower and has wind-turbine rotor blade attached thereto, a main shaft connected to this rotor head so as to rotate together therewith, a speed-increasing gearbox connected to the main shaft that rotates in response to wind force received by the wind-turbine rotor blade, and a generator driven by a shaft output of the speed-increasing gearbox. In a wind turbine generator having such a configuration, the rotor head, which is equipped with the wind-turbine rotor blade that convert wind force into torque, and the main shaft rotate so as to generate a shaft output, and the shaft output is increased in rotation speed via the speed-increasing gearbox connected to the main shaft and is transmitted to the generator. Therefore, the shaft output obtained by converting wind force into torque acts as a driving source for the generator, whereby electricity can be generated by utilizing the wind force as power for the generator.

Normally, in the wind turbine generator of the related art described above, a drive train equipped with the speed-increasing gearbox and the generator is disposed inside the nacelle. For this reason, a frame such as a nacelle bedplate that supports the drive train has a relatively heavy structure for ensuring, for example, an installation space for the drive train. In the case of a single-bearing structure, it is difficult to support the rotor head during replacement of the speed-increasing gearbox since it also serves as a support structure for the rotor head.

There is also a structure in which the generator is disposed between a rotor and the nacelle, the generator in this case is non-replaceable.

For the purpose of reducing the size and weight of the nacelle, there has been proposed a configuration in which the drive train extending from the main shaft to the generator via the speed-increasing gearbox is installed inside the rotor head (for example, see Patent Document 1).

PATENT DOCUMENT 1

Japanese Unexamined Patent Application, Publication No. 2006-188953

DISCLOSURE OF INVENTION

Because wind turbine generator tends to have high output and be large in size in recent years, weight reduction in the structure of the nacelle bedplate is desired in order to reduce the load on the tower, the foundation, etc. In view of replaceability and maintainability of the drive train component, such as the generator, accommodated and installed in the nacelle, there is a need to ensure a work space in the nacelle. Because ensuring such a work space means forming a space that is not to be used during operation, this is a factor responsible for an increase in the nacelle size.

Moreover, as wind turbine generator become larger in size, the drive train component also tend to become larger and heavier, and the working conditions at the installation site to become severe. Therefore, a configuration that particularly allows for easier installation work on the actual site as well as easier maintenance work, such as replacement of devices, is desired.

In view of the circumstances described above, an object of the present invention is to provide a wind turbine generator that allows for size and weight reduction of a nacelle bedplate and that enables easier maintainability, such as device replaceability.

In order to achieve the aforementioned object, the present invention provides the following solutions.

A wind turbine generator according to the present invention generates electricity by driving a generator connected, via a drive train, to a rotor head that has wind-turbine rotor blades attached thereto and rotates together therewith. In the wind turbine generator, at least a part of the drive train that transmits torque from the rotor head to the generator is disposed on a side of the rotor head opposite a nacelle.

The side of the rotor head opposite the nacelle refers to the front side of the rotor head in an upwind wind turbine generator or to the rear side of the rotor head in a downwind wind turbine generator. In either case, a configuration in which a speed-increasing gearbox and/or the generator constituting the drive train is/are partly disposed inside the rotor head and/or the nacelle is included.

According to this wind turbine generator, because at least a part of the drive train that transmits torque from the rotor head to the generator is disposed on the side of the rotor head opposite the nacelle (i.e., the front side or the rear side of the rotor head), heavy devices accommodated and installed in the nacelle can be reduced in number, and a space that needs to be ensured for the purpose of maintenance or the like can be reduced.

In the aforementioned drive train, the generator preferably includes one or more generators. In particular, the use of a multi-type equipped with a plurality of generators contributes to size and weight reduction as well as an improvement in maintainability, such as replaceability of generators. Moreover, in the case of a multi-type equipped with a plurality of generators, it is not necessary to terminate the overall operation of the wind turbine generator even when a problem occurs in a generator; hence, the remaining normally-operating generator or generators can continue to generate electricity.

In the aforementioned drive train, it is preferable that the generator be disposed closer to the nacelle relative to the speed-increasing gearbox. Thus, the center of gravity of the drive train can be located closer towards the nacelle (i.e., towards a main bearing). In this case, it is preferable that at least a part of the generator, preferably, a part of the generator and the speed-increasing gearbox, be disposed within the rotor head so that the center of gravity of the drive train can be located even closer towards the nacelle.

When the generator is disposed closer to the nacelle relative to the speed-increasing gearbox, the center of gravity of the drive train can be located even closer towards the nacelle by disposing the generator inside the nacelle.

According to the wind turbine generator of the present invention described above, since at least a part of the drive train that transmits torque from the rotor head to the generator is disposed on the side of the rotor head opposite the nacelle, that is, in front of the nacelle in an upwind type or behind the nacelle in a downwind type, a space that needs to be ensured within the nacelle for the purpose of maintenance or the like but is unnecessary during normal operation can be reduced, whereby the nacelle itself can be reduced in size and have a low-profile shape.

In particular, the use of a multi-type configuration having a plurality of generators facilitates maintenance work, such as replacement of small-size generators, and allows the operation to continue in a low output state of generated electricity even when a problem occurs in a generator.

Even if the wind turbine generator is increased in size, the nacelle bedplate, which supports the drive train within the nacelle in the structure of the related art, no longer holds large-size heavy devices such as the generator and the speed-increasing gearbox and thus only needs to support the main shaft, thereby allowing for reduction in size and weight of the nacelle bedplate. In comparison with the structure of the related art, the weight can be expected to be reduced by about 10% to 15%.

In particular, by disposing the generator closer to the nacelle relative to the speed-increasing gearbox so that the center of gravity of the drive train is located closer towards the nacelle (i.e., towards the main bearing), the support structure can be reduced in weight by a reduction in moment, whereby the drive train and the nacelle can readily have a lightweight compact structure.

Since the drive train is attached to the front side or the rear side of the rotor head, the drive train overhangs forward or rearward when a rotor-head cover is removed. This facilitates the process of replacing the drive train and constituent devices thereof using a crane.

In particular, disposing the generator closer to the nacelle relative to the speed-increasing gearbox is advantageous in terms of improved work efficiency since the speed-increasing gearbox, which may require more frequent maintenance and replacement, can be positioned at the end.

EXPLANATION OF REFERENCE SIGNS

Figure 1:
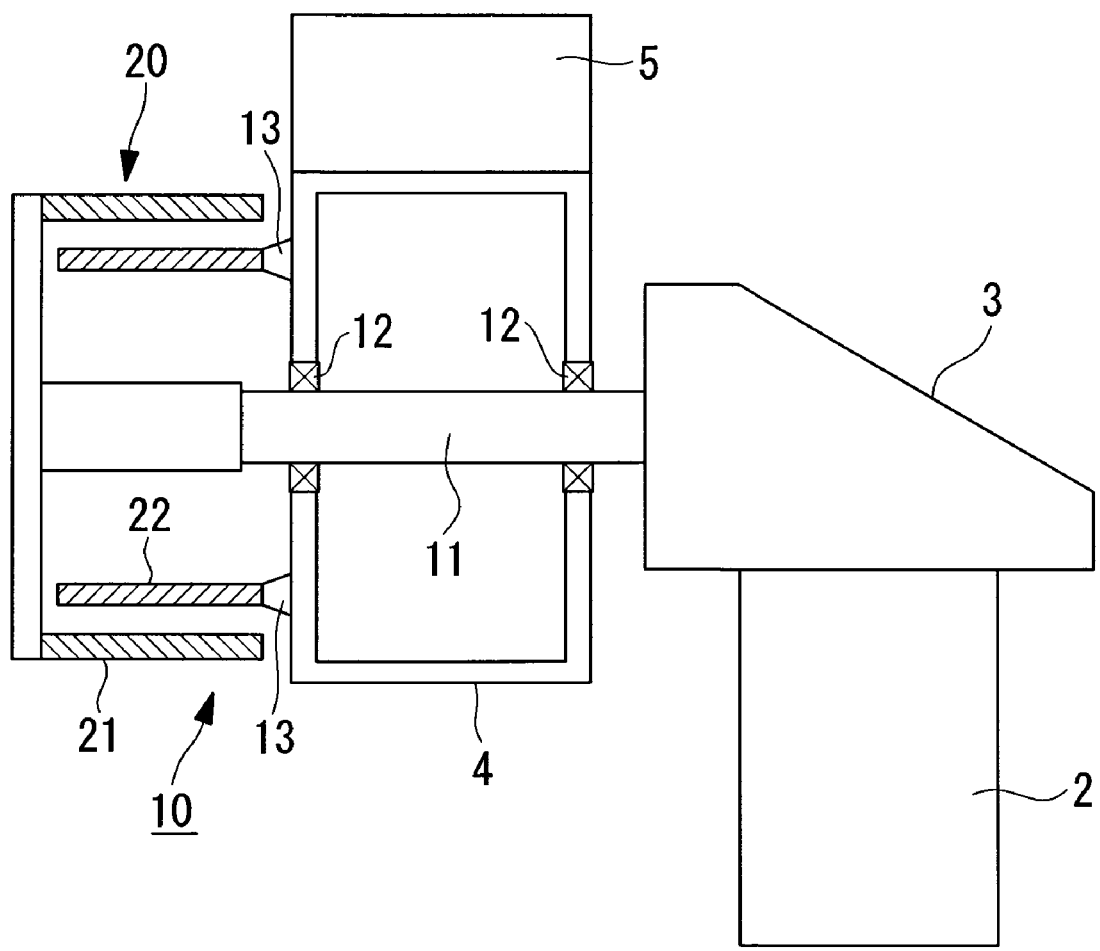
FIG. 1 illustrates an embodiment of a wind turbine generator according to the present invention and is an enlarged cross-sectional view showing a relevant part of an example of an internal configuration of a nacelle and its surrounding area as a first embodiment.

1: wind turbine generator
2: tower
3: nacelle
4: rotor head
5: wind-turbine rotor blade
10, 10A-10N: drive train 11: main shaft
20: generator
30A-30G: speed-increasing gearbox
40: multi-type generator
41: mini-generator

BEST MODE FOR CARRYING OUT THE INVENTION

An embodiment of a wind turbine generator according to the present invention will be described below with reference to the drawings.

Figure 2:
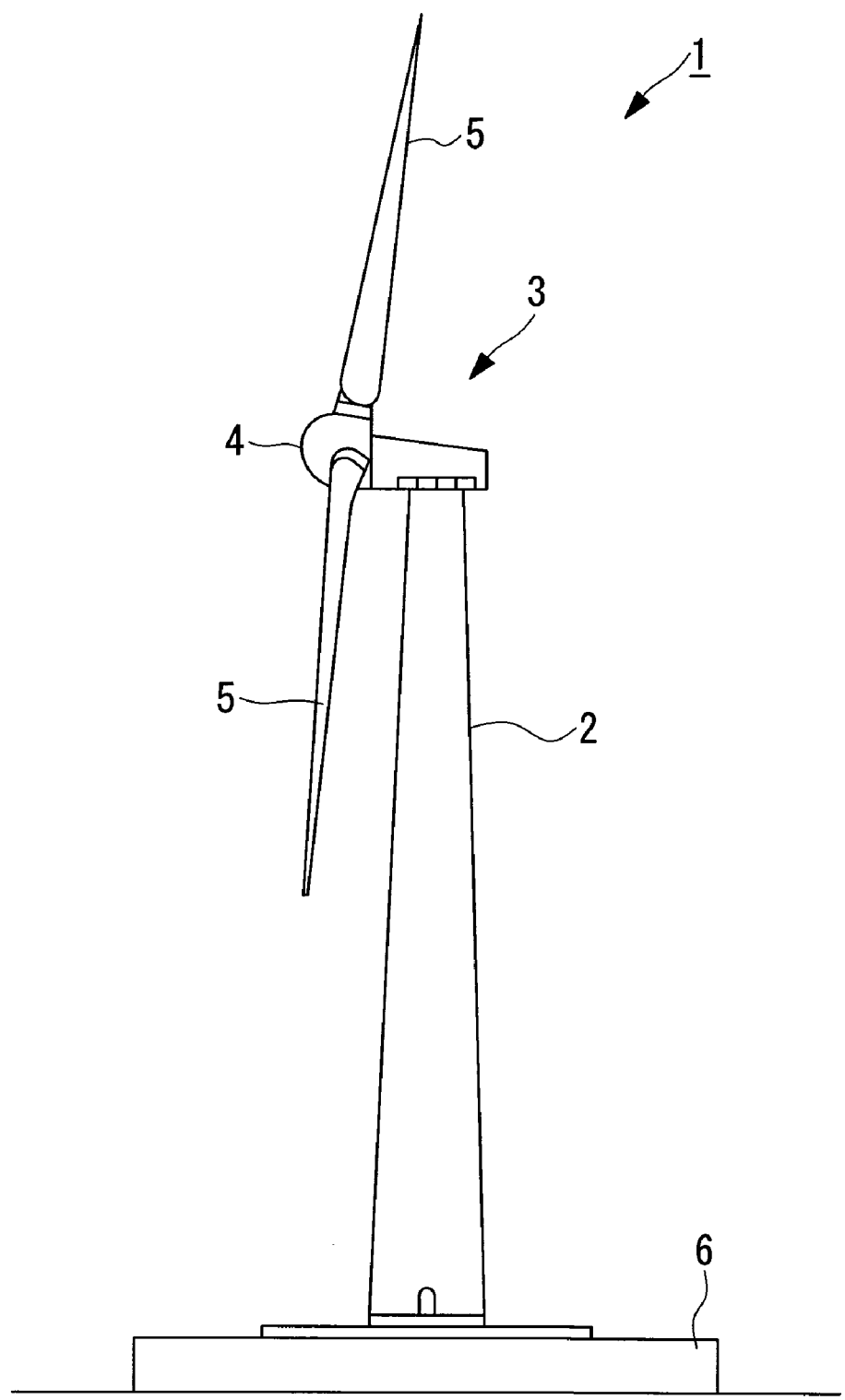
FIG. 2 illustrates an example of the overall configuration of the wind turbine generator.

A wind turbine generator 1 shown in FIG. 2 includes a tower 2 standing on a foundation 6, a nacelle 3 mounted on the top of the tower 2, and a rotor head 4 provided on the nacelle 3 in a rotatable manner about an axis extending substantially in the horizontal direction.

Multiple wind-turbine rotor blades 5 are attached to the rotor head 4 so as to extend radially around the rotation axis thereof. Thus, the force of wind striking the wind-turbine rotor blade 5 in the rotation-axis direction of the rotor head 4 is converted to power that rotates the rotor head 4 about the rotation axis. The wind turbine generator 1 shown in the drawing is of a so-called upwind type in which the wind-turbine rotor blade 5 are configured to rotate in front of the nacelle 3.

First Embodiment

FIG. 1 is an enlarged cross-sectional view of showing a relevant part of an example of an internal configuration of the rotor head 4 disposed in front of the nacelle 3 and a drive train 10 disposed in front of the rotor head 4 in a state where a rotor-head cover (not shown) is removed. In the embodiment to be described below, the drive train 10 is configured to transmit the rotation of the rotor head 4 directly to a generator 20 without intervention of a speed-increasing gearbox.

In FIG. 1, the rotor head 4 having the wind-turbine rotor blade 5 is supported by a main shaft 11, which protrudes forward from the nacelle 3, via bearings 12. In other words, when the wind-turbine rotor blade 5 receive wind, the rotor head 4 rotates together with the wind-turbine rotor blade 5 about the main shaft 11 securely supported by the nacelle 3.

A cylindrical stator 21 that constitutes the generator 20 is provided at an end of the main shaft 11 securely supported by the nacelle 3. A cylindrical rotor 22 that also constitutes the generator 20 is attached to a front face of the rotor head 4 via a flexible coupling 13 for maintaining a gap with the stator 21. A flexible coupling 13 is used in the configuration shown in the drawing, the basic structure is such that the rotor 22 is directly fixed to the front face of the rotor head 4 or fixed thereto via a rigid coupling.

The rotor 22 has a diameter smaller than that of the stator 21, and the rotor 22 is disposed within the stator 21. Specifically, in this case, since the rotor 22 rotating together with the rotor head 4 rotates within the stator 21 substantially coaxially therewith, the generator 20 generates electricity on the basis of the law of electromagnetic induction.

Figure 3:
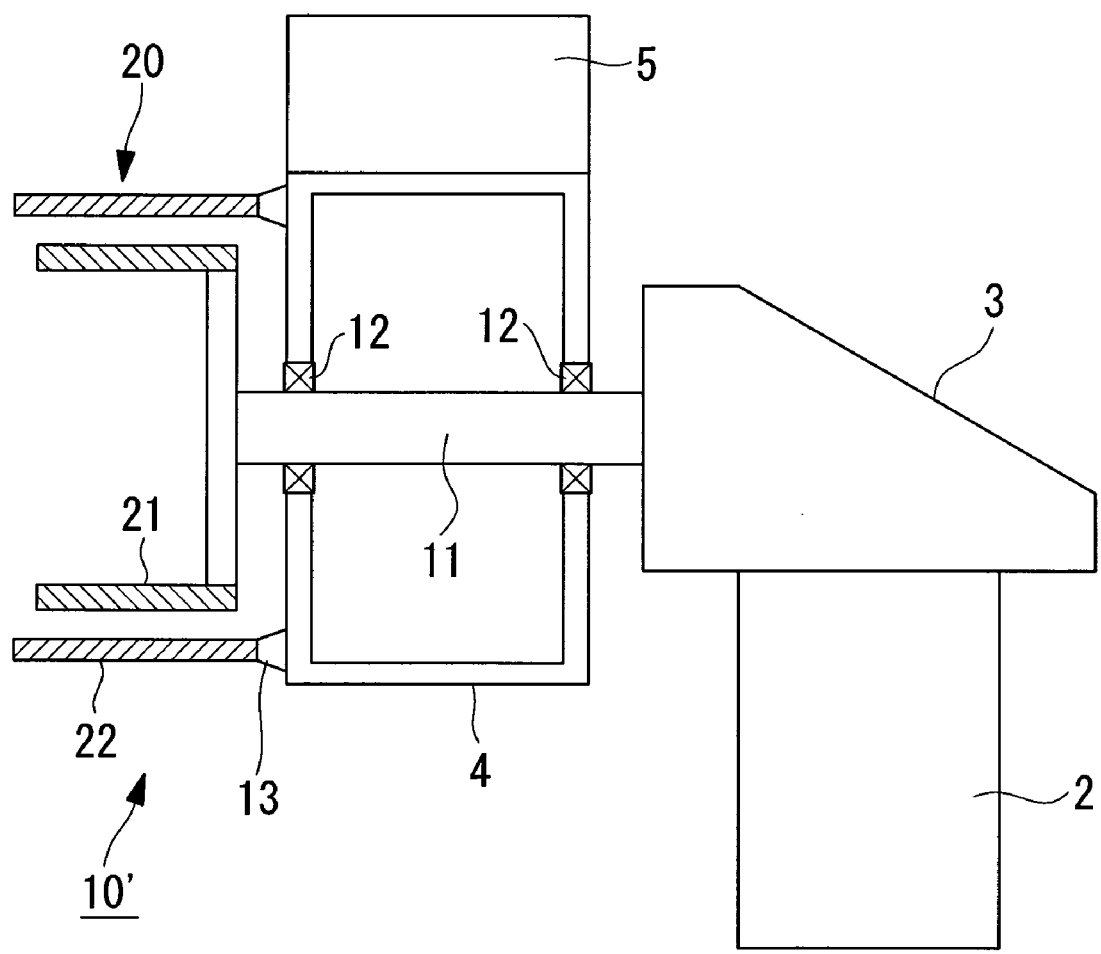
FIG. 3 is a cross-sectional view showing a modification of the first embodiment.

The embodiment described above employs the configuration in which the rotor 22 is disposed within the stator 21. However, a configuration in which the stator 21 is disposed within the rotor 22, as in, for example, a modification shown in FIG. 3, may be also permissible. Specifically, in a drive train 10' shown in FIG. 3 having no speed-increasing gearbox, the stator 21 with a diameter smaller than that of the rotor 22 is securely attached to the end of the main shaft 11, and the rotor 22 attached to the front face of the rotor head 4 via the flexible coupling 13 rotates around the stator 21. Similar to the above, the rotor 22 in this case is not limited to the structure that uses the flexible coupling 13, and may basically be directly fixed to the front face of the rotor head 4 or fixed thereto via a rigid coupling.

Accordingly, with regard to whether the stator 21 and the rotor 22 are arranged inside or outside of each other, even though either arrangement employed, electricity can be generated on the basis of the law of electromagnetic induction.

Since the drive train 10 or 10' that transmits torque generated in response to wind received by the wind-turbine rotor blade 5 to the generator 20 is disposed in front of the rotor head 4, an excess space in the nacelle 3 can be reduced. In other words, since the drive train component, such as the generator 20, do not need to be accommodated and installed in the nacelle 3, the load on a nacelle bedplate (not shown) for supporting these devices, which are large in size and heavy, is significantly reduced. Therefore, even if the wind turbine generator 1 is increased in size, the nacelle bedplate in the nacelle 3 only needs to support the main shaft 11, thereby allowing for reduction in size and weight of the nacelle bedplate.

Since the drive train 10 or 10' that transmits torque from the rotor head 4 to the generator 20 is disposed in front of the rotor head 4, an excess space in the nacelle 3, that is, a space ensured as a work space for maintenance or the like, can be reduced, thereby allowing for a small-size, low-profile nacelle 3 which itself has a minimal space.

Since the drive train 10 or 10' is attached to the front side of the rotor head 4, the drive train 10, 10' overhangs in front of the rotor head 4 when the rotor-head cover is removed. This facilitates the process of replacing the drive train 10 or 10' and constituent devices, such as the generator 20, using a crane.

Second Embodiment

Figure 4:
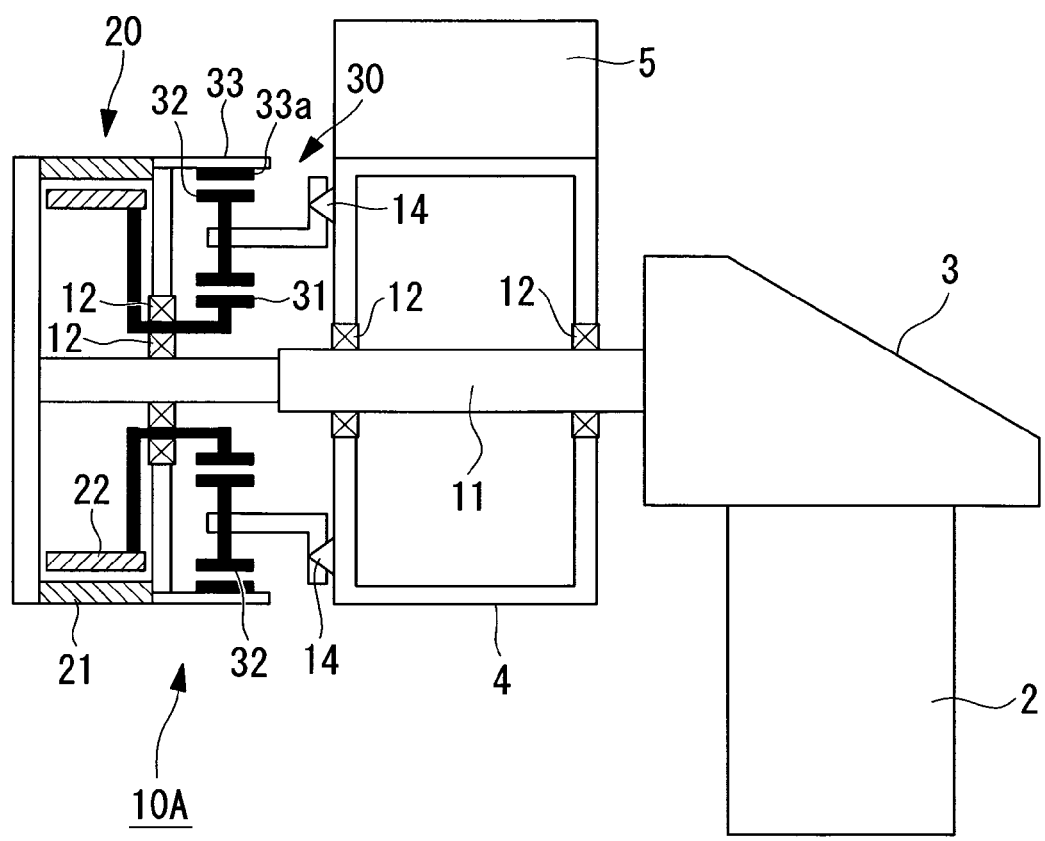
FIG. 4 is an enlarged cross-sectional view showing a relevant part of an example of the internal configuration of the nacelle and its surrounding area as a second embodiment of the wind turbine generator according to the present invention.

Next, a second embodiment of the wind turbine generator according to the present invention will be described with reference to FIG. 4. Components similar to those in the above embodiment will be given the same reference numerals, and detailed descriptions thereof will be omitted.

A drive train 10A in this embodiment is equipped with a speed-increasing gearbox 30 between the rotor head 4 and the generator 20 for increasing the speed of rotation of the rotor head 4 and transmitting it to the generator 20. In this case, the speed-increasing gearbox 30 is a single-stage planetary speed-increasing gearbox, and reference numeral 31 in the drawing denotes a sun gear and 32 denotes planet gears.

In the aforementioned speed-increasing gearbox 30, the sun gear 31, which is rotatably supported by the end of the main shaft 11 via bearings 12, is meshed with the plurality of planet gears 32, which are supported by the front face of the rotor head 4 via a rigid coupling 14, and the planet gears 32 are meshed with a gear section 33a formed on an inner peripheral surface of a casing 33. The planet gears 32, which are arranged at an equal pitch in the circumferential direction of the sun gear 31, revolve around the sun gear 31 together with the rotor head 4 while rotating on their axes. As a result, the sun gear 31 rotates at a speed accelerate by the rotation speed of the rotor head 4 in accordance with the gear ratio between the sun gear 31 and the planet gears 32.

With regard to the support structure for the planet gears 32, it is possible to employ the aforementioned structure that uses the rigid coupling 14 or a structure that directly fixes the planet gears 32, although the basic structure is such that they are fixed using a flexible coupling.

On the other hand, in the generator 20, the stator 21 is fixed to the end of the main shaft 11, and the rotor 22 integrally connected to the sun gear 31 rotates within the stator 21 substantially coaxially therewith. Specifically, the generator 20 in this embodiment is configured to generate electricity by causing electromagnetic induction to occur between the stator 21 and the rotor 22 rotating at a speed accelerate by the rotor head 4. Although not shown in the drawing, a multi-type generator having multiple output shafts instead of one shaft may be employed behind the planetary stage of the speed-increasing gearbox 30. As in, for example, embodiments to be described later with reference to FIGS. 16 to 18, a speed-increasing gearbox in this multi-type generator has multiple output shafts constituted by two-stage planet gears or spur gears, and the individual output shafts are configured to drive a plurality of generators.

With such a configuration, the drive train component, such as the generator 20, do not need to be accommodated and installed in the nacelle 3, as in the first embodiment, whereby the load on the nacelle bedplate (not shown) for supporting these devices, which are large in size and heavy, is significantly reduced. Therefore, even if the wind turbine generator 1 is increased in size, the nacelle bedplate in the nacelle 3 only needs to support the main shaft 11, thereby allowing for reduction in size and weight of the nacelle bedplate.

Since the drive train 10A that transmits torque from the rotor head 4 to the generator 20 is disposed in front of the rotor head 4, an excess space in the nacelle 3 can be reduced, thereby allowing for a small-size, low-profile nacelle 3 which itself has a minimal space.

Since the drive train 10A is attached to the front side of the rotor head 4, the drive train 10, 10' overhangs in front of the rotor head 4 when the rotor-head cover is removed. This facilitates the process of replacing the drive train 10A and constituent devices, such as the generator 20, using a crane.

Third Embodiment

Figure 5:
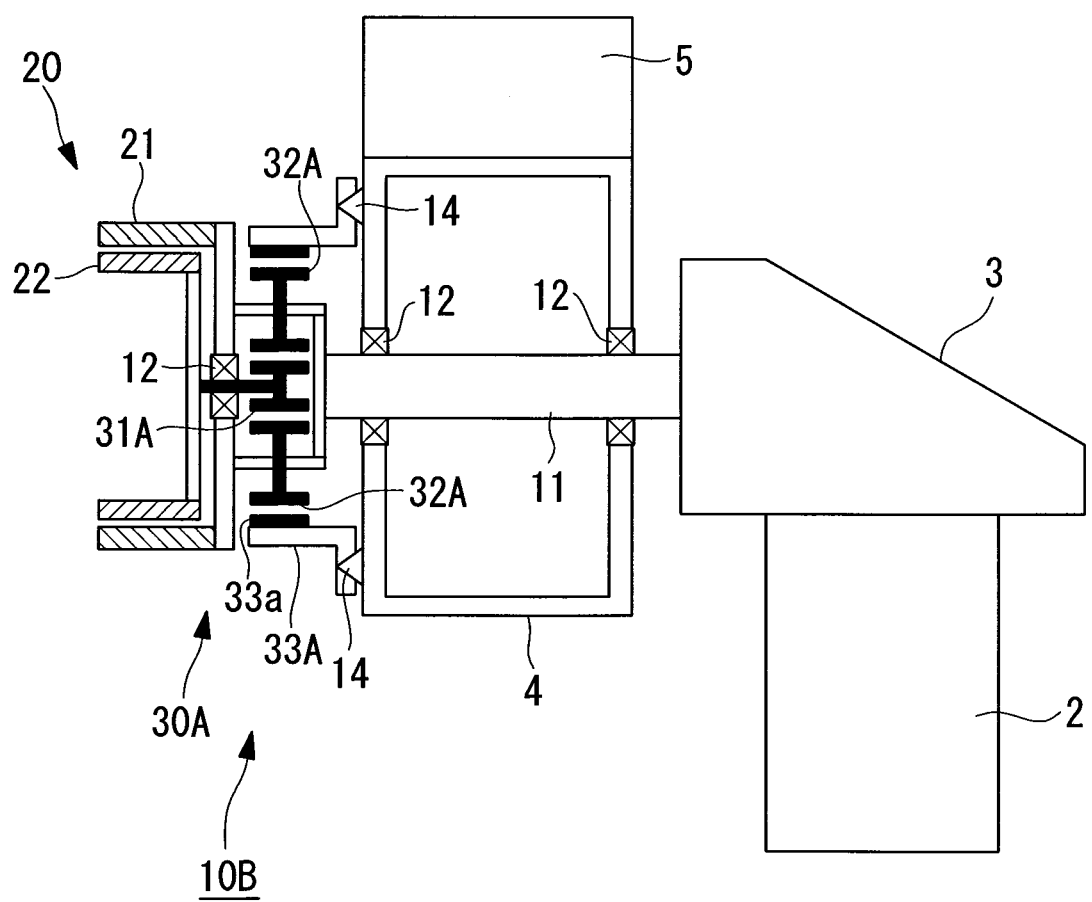
FIG. 5 is an enlarged cross-sectional view showing a relevant part of an example of the internal configuration of the nacelle and its surrounding area as a third embodiment of the wind turbine generator according to the present invention.

Next, a third embodiment of the wind turbine generator according to the present invention will be described with reference to FIG. 5. Components similar to those in the above embodiments will be given the same reference numerals, and detailed descriptions thereof will be omitted.

A drive train 10B in this embodiment is equipped with a speed-increasing gearbox 30A between the rotor head 4 and the generator 20 for increasing the speed of rotation of the rotor head 4 and transmitting it to the generator 20. In this case, the speed-increasing gearbox 30A is a single-stage star-type speed-increasing gearbox, and reference numeral 31A in the drawing denotes a sun gear and 32A denotes planet gears. The planet gears 32A in the star-type speed-increasing gearbox 30A are rotatable by being supported by the main shaft 11 at the fixed side, and are meshed with a gear section 33a at the outer peripheral side, which is formed on an inner peripheral surface of a casing 33A that rotates together with the rotor head 4.

Consequently, the casing 33A rotates at the same speed as the rotor head 4, while the speed of the sun gear 31A is increased in accordance with the gear ratio between the gear section 33a of the casing 33A, the planet gears 32A, and the sun gear 31A. In this case, since the rotor 22 is coaxial with the sun gear 31A, the generator 20 in this embodiment is similarly configured to generate electricity by causing electromagnetic induction to occur between the stator 21 and the rotor 22 rotating at a speed accelerate by the rotation speed of the rotor head 4. In this embodiment, a multi-type generator may be employed in place of the generator 20.

With such a configuration, the drive train component, such as the generator 20, do not need to be accommodated and installed in the nacelle 3, as in the above embodiments, whereby the load on the nacelle bedplate (not shown) for supporting these devices, which are large in size and heavy, is significantly reduced.

Fourth Embodiment

Figure 6:
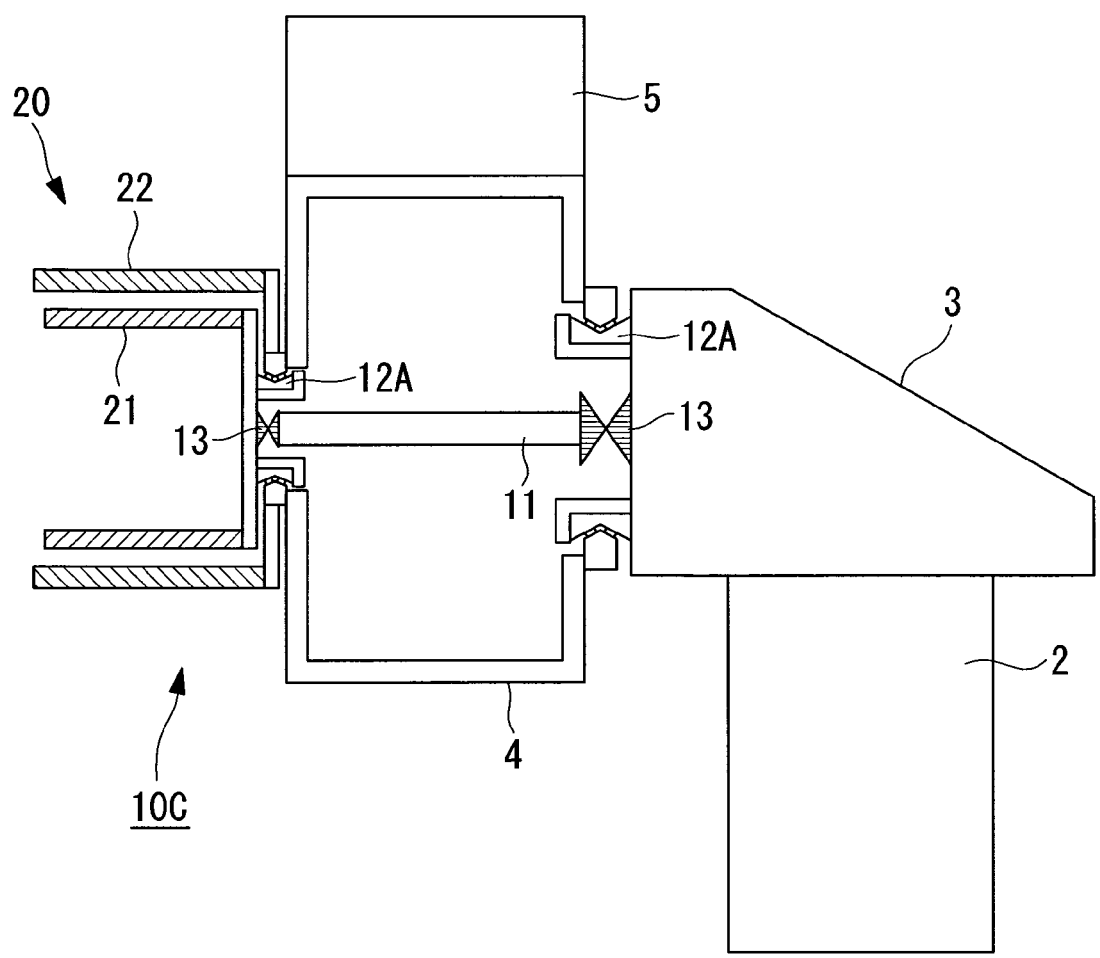
FIG. 6 is an enlarged cross-sectional view showing a relevant part of an example of the internal configuration of the nacelle and its surrounding area as a fourth embodiment of the wind turbine generator according to the present invention.

Next, a fourth embodiment of the wind turbine generator according to the present invention will be described with reference to FIG. 6. Components similar to those in the above embodiments will be given the same reference numerals, and detailed descriptions thereof will be omitted.

A drive train 10C in this embodiment is of a type not having a speed-increasing function, and the generator 20 has a different configuration. Specifically, in this case, the generator 20 generates electricity by causing the rotor 22 to rotate around the stator 21.

The stator 21 is attached to the end of the main shaft 11, which is securely supported by the front face of the nacelle 3 via a flexible coupling 13, furthermore, it is attached via another flexible coupling 13. Although the flexible couplings 13 are arranged in two stages in the example shown in the drawings, a single stage or multiple stages of three or more stages may be also permissible, a quill shaft may be also permissible. Examples of a flexible coupling 13 include a gear coupling, a diaphragm, a multi-disc type, and a microbush.

The rotor head 4 is rotatably supported by support sections provided at the front face of the nacelle 3 and the rear face of the stator 21 via bearings 12A. The bearings 12A used here can withstand loads acting in the radial direction and the axial direction and are capable of supporting a moment, like a double-row tapered roller bearing or a triple-roller bearing. The front face of the rotor head 4 has the rotor 22 attached thereto, which rotates together therewith. Specifically, in this case, since the rotor 22 rotating together with the rotor head 4 rotates around the stator 21 substantially coaxially therewith, the generator 20 generates electricity on the basis of the law of electromagnetic induction.

With such a configuration, the drive train component, such as the generator 20, do not need to be accommodated and installed in the nacelle 3, as in the above embodiments, whereby the load on the nacelle bedplate (not shown) for supporting these devices, which are large in size and heavy, is significantly reduced.

The support relationship between the nacelle 3 and the rotor head 4 is not limited to an outer-race rotation type in which the rotor head 4 rotates around the outer periphery of the bearing 12A, and may alternatively employ an inner-race rotation type (see FIG. 13 to be described later) in which the rotor head 4 rotates within the inner periphery of the bearing 12A.

Fifth Embodiment

Next, a fifth embodiment of the wind turbine generator according to the present invention will be described with reference to FIG. 7. Components similar to those in the above embodiments will be given the same reference numerals, and detailed descriptions thereof will be omitted.

A drive train 10D in this embodiment is of a type not having a speed-increasing function, like the fourth embodiment, and the generator 20 has a different configuration. Specifically, in this case, the generator 20 generates electricity by causing the rotor 22 to rotate within the stator 21.

The rotor 22 in this case is attached to the front face of the rotor head 4 via a rigid coupling 14. Moreover, because a bearing 12A is provided between the rotor 22 and the stator 21, the rotor 22 rotating together with the rotor head 4 is rotatable relative to the stator 21 that is securely supported by the end of the main shaft 11. The attachment of the rotor 22 is not limited to the aforementioned structure that uses the rigid coupling 14, and may alternatively employ a structure in which it is directly fixed to the front face of the rotor head 4.

Specifically, in this case, because the rotor 22 rotating together with the rotor head 4 rotates within the stator 21 substantially coaxially therewith, the generator 20 generates electricity on the basis of the law of electromagnetic induction.

The support relationship between the nacelle 3 and the rotor head 4 is not limited to an outer-race rotation type in which the rotor head 4 rotates around the outer periphery of the bearing 12A, and may alternatively employ an inner-race rotation type (see FIG. 13 to be described later) in which the rotor head 4 rotates within the inner periphery of the bearing 12A.

Figure 7:
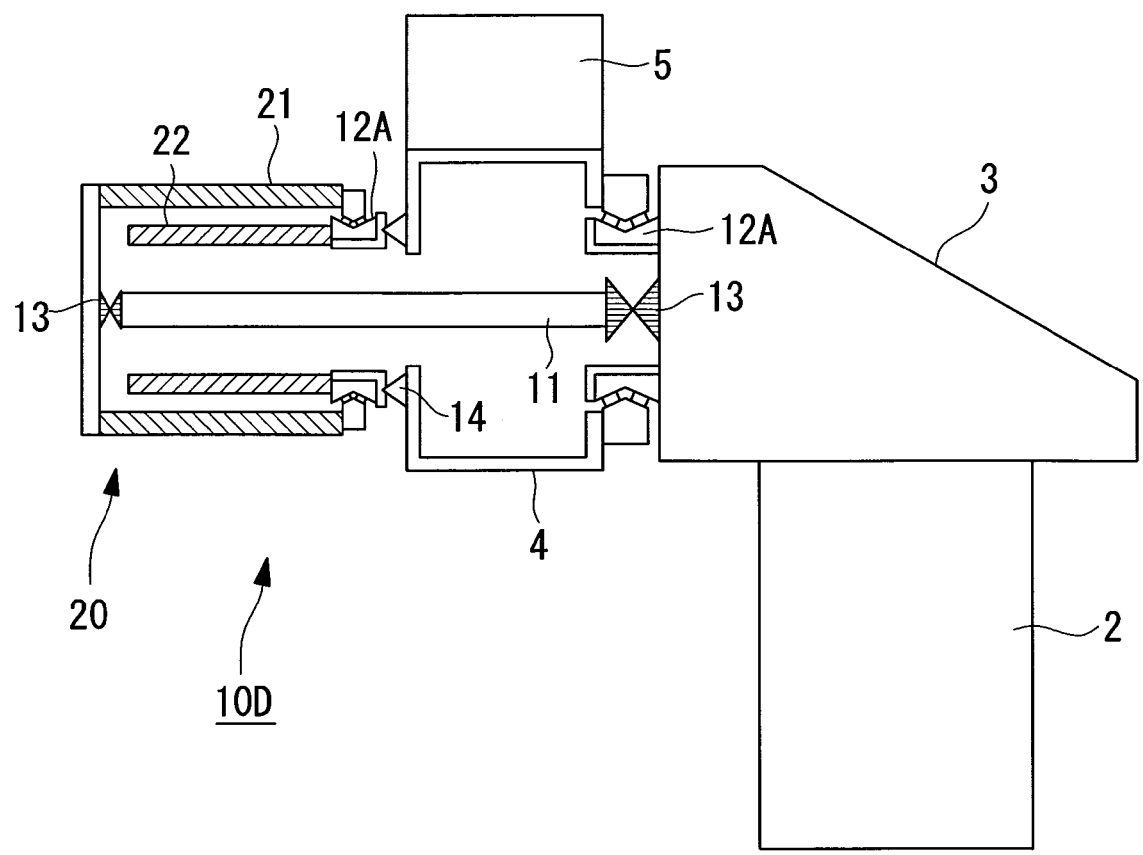
FIG. 7 is an enlarged cross-sectional view showing a relevant part of an example of the internal configuration of the nacelle and its surrounding area as a fifth embodiment of the wind turbine generator according to the present invention.
Figure 8:
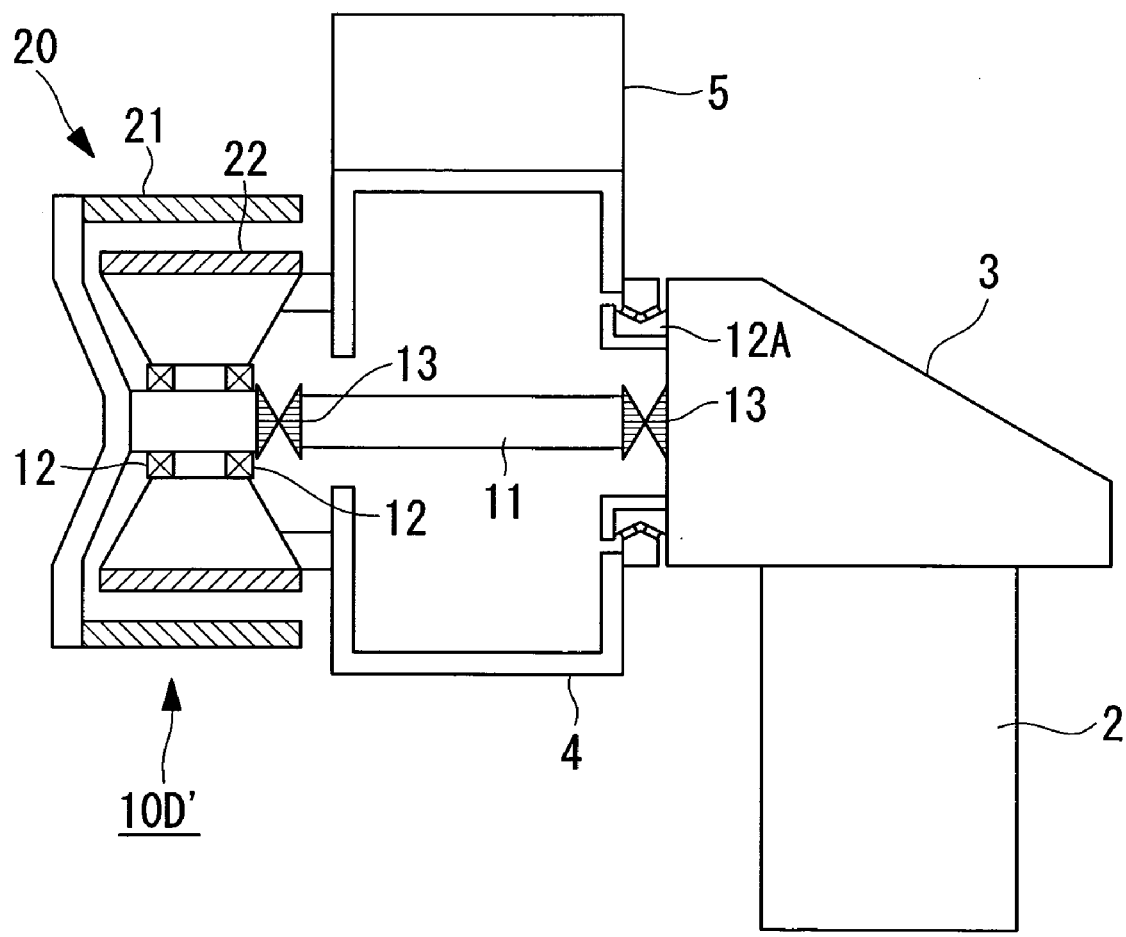
FIG. 8 is a cross-sectional view showing a first modification of the fifth embodiment.

A drive train 10D' having a configuration shown in FIG. 8 is a first modification of FIG. 7. This first modification has a different structure for supporting the rotor 22 of the generator 20.

Specifically, the generator 20 in this modification has the stator 21 attached to the end of the main shaft 11, which is equipped with two stages of flexible couplings 13, and generates electricity by causing the rotor 22 to rotate within the stator 21 together with the rotor head 4.

In this case, the rotor 22 is rotatably supported by the main shaft 11 via a pair of bearings 12. The two stages of flexible couplings 13 are provided between the end of the main shaft 11 that supports the rotation of the rotor 22 and the nacelle 3 that supports the other end of the main shaft 11. Therefore, a rotary system and a structural system of the wind turbine generator 1 are isolated from each other by the flexible couplings 13, whereby transmission of an input from the rotary system to the structural system can be reduced and a gap between the stator 21 and the rotor 22 can be maintained within a predetermined range.

Figure 9:
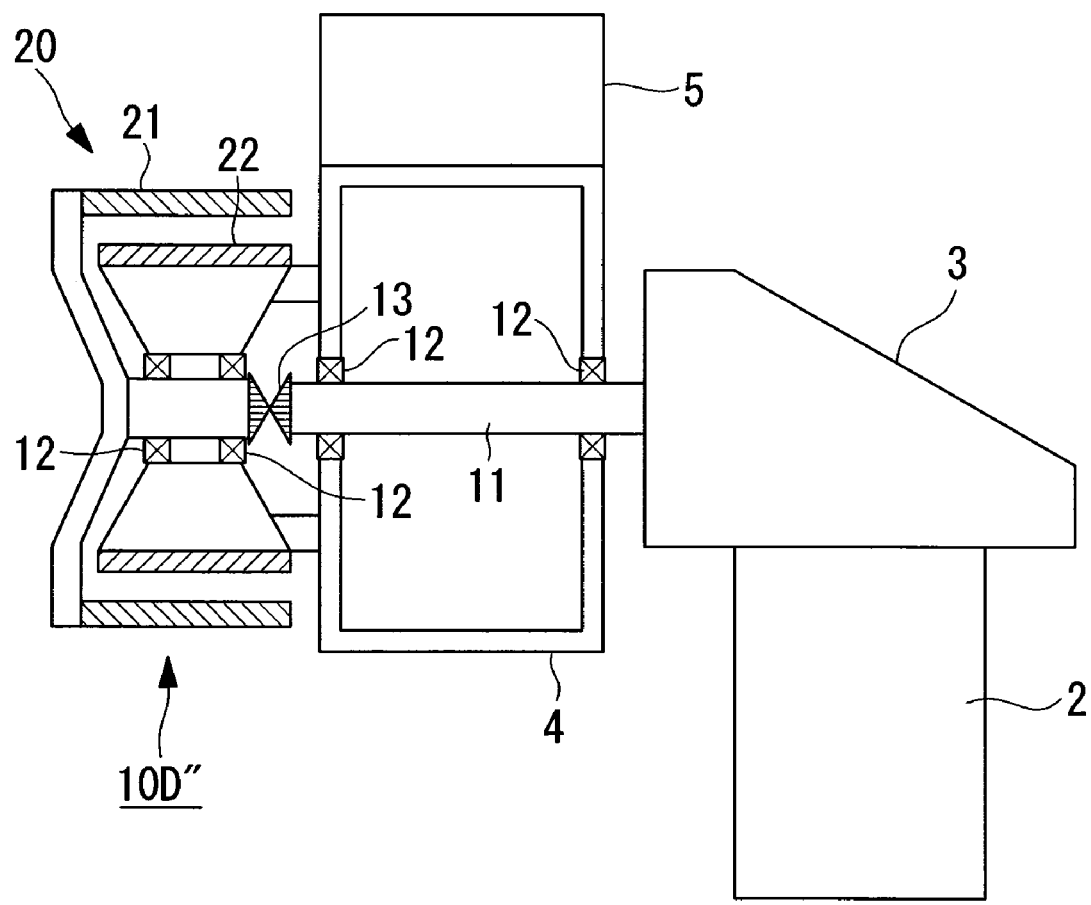
FIG. 9 is a cross-sectional view showing a second modification of the fifth embodiment.

A drive train 10D" having a configuration shown in FIG. 9 is a second modification of FIG. 7. In this second modification, the main shaft 11 supports the rotation of the rotor head 4 via a pair of bearings 12. In this case, a single-stage flexible coupling 13 acting as an isolator between the rotary system and the structural system is provided between a nacelle-3-side segment of the main shaft 11, which supports the rotation of the rotor head 4, and an end segment that supports the rotation of the rotor 22.

With such a configuration of the second modification, the rotary system and the structural system of the wind turbine generator 1 can be similarly isolated from each other by the flexible coupling 13, whereby transmission of an input from the rotary system to the structural system can be reduced and a gap between the stator 21 and the rotor 22 can be maintained within a predetermined range.

A single-stage flexible coupling 13 is used in the second modification shown in the drawing, two stages thereof may be also permissible by adding another flexible coupling to an end of the nacelle 3, as in the first modification described above.

In the above modifications, a double-row tapered roller bearing, for example, may be used as an alternative to the pair of bearings 12 that support the stator 1222, so as to eliminate a moment.

Sixth Embodiment

Next, a sixth embodiment of the wind turbine generator according to the present invention will be described with reference to FIG. 10. Components similar to those in the above embodiments will be given the same reference numerals, and detailed descriptions thereof will be omitted.

A drive train 10E in this embodiment employs a single-stage planetary speed-increasing gearbox 30. In this drive train 10E, the stator 21 is attached to the end of the main shaft 11, which is equipped with two stages of flexible couplings 13, and the rotor 22 rotates together with the sun gear 31. Due to the planet gears 32 that revolve around the sun gear 31 while rotating together with the rotor head 4, the sun gear 31 rotates at a speed accelerate by the rotation speed of the rotor head 4.

Specifically, in this case, because the rotor 22 rotating together with the sun gear 31 rotates within the stator 21 substantially coaxially therewith, the generator 20 generates electricity on the basis of the law of electromagnetic induction. In this embodiment, a multi-type generator like a two-stage speed-increasing type to be described later with reference to FIG. 18, for example, may be used in place of the generator 20.

Figure 11:
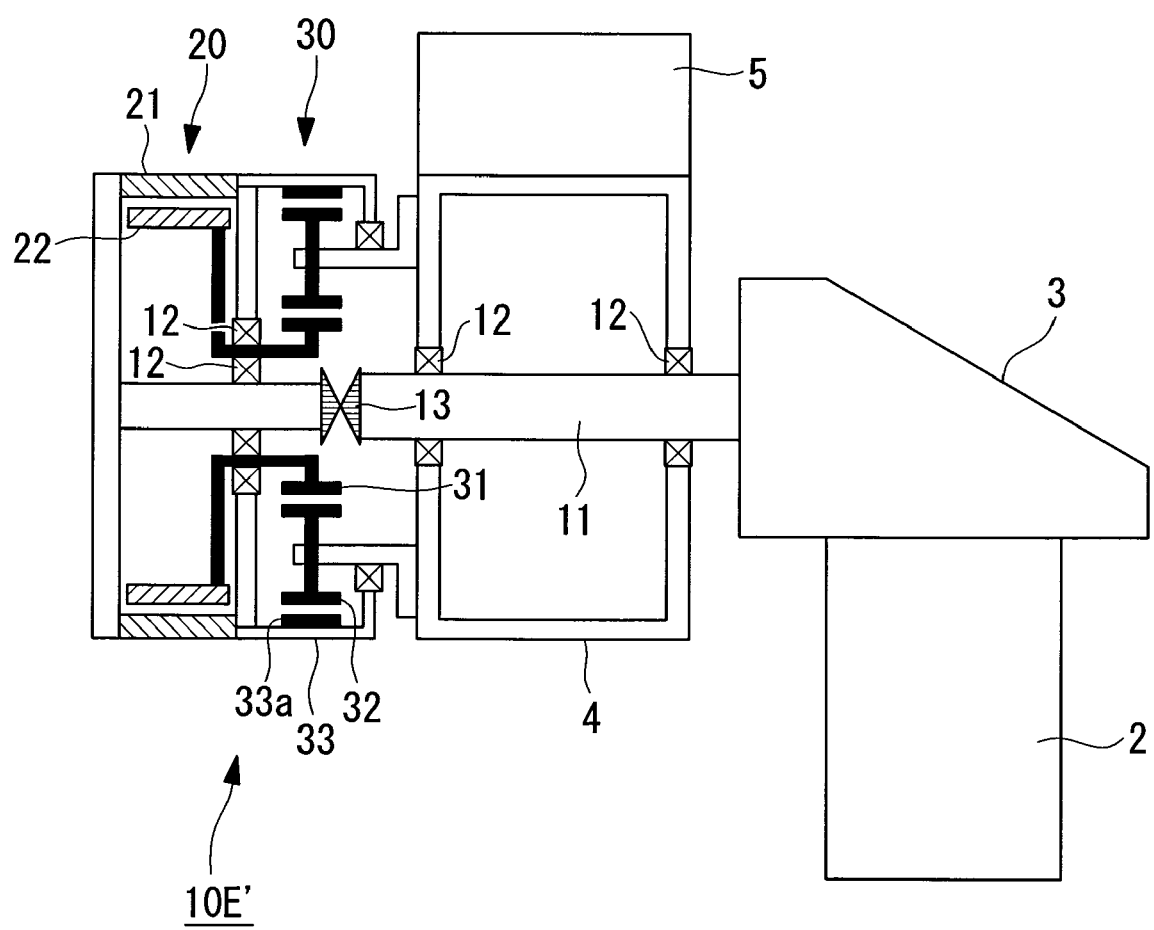
FIG. 11 is a cross-sectional view showing a modification of the sixth embodiment.

As in a modification shown in FIG. 11, the rotor head 4 may be supported by the main shaft 11 via bearings 12 as a rotary support structure therefor, and a drive train 10E' having a single-stage flexible coupling 13 may be used. In this modification, because the generator 20 has the same configuration as the aforementioned embodiment, the use of a multi-type generator is also possible.

The support relationship between the nacelle 3 and the rotor head 4 is not limited to an outer-race rotation type in which the rotor head 4 rotates around the outer periphery of the bearing 12A, and may alternatively employ an inner-race rotation type (see FIG. 13 to be described later) in which the rotor head 4 rotates within the inner periphery of the bearing 12A.

Seventh Embodiment

Next, a seventh embodiment of the wind turbine generator according to the present invention will be described with reference to FIG. 12. Components similar to those in the above embodiments will be given the same reference numerals, and detailed descriptions thereof will be omitted.

A drive train 10F in this embodiment employs a single-stage star-type speed-increasing gearbox 30A. In this drive train 10F, planet gears 32A are supported by the end of the main shaft 11, which is equipped with two stages of flexible couplings 13, and the stator 21 is attached to the end. On the other hand, the rotor 22 is coaxially connected to the sun gear 31A which is rotatably supported by the rear face of the stator 21.

The casing 33 is made to rotate together with the rotor head 4 so that, because the gear section 33a of the casing 33, the planet gears 32A, and the sun gear 31A are meshed with each other, the rotor 22 rotates at a speed accelerate by the rotation speed of the rotor head 4 in accordance with the gear ratio. Specifically, in this case, because the rotor 22 rotating together with the sun gear 31A rotates within the stator 21 substantially coaxially therewith, the generator 20 generates electricity on the basis of the law of electromagnetic induction. In this embodiment, a multi-type generator of a two-stage speed-increasing type like the one to be described later with reference to FIG. 19, for example, may be used in place of the generator 20.

Figure 12:
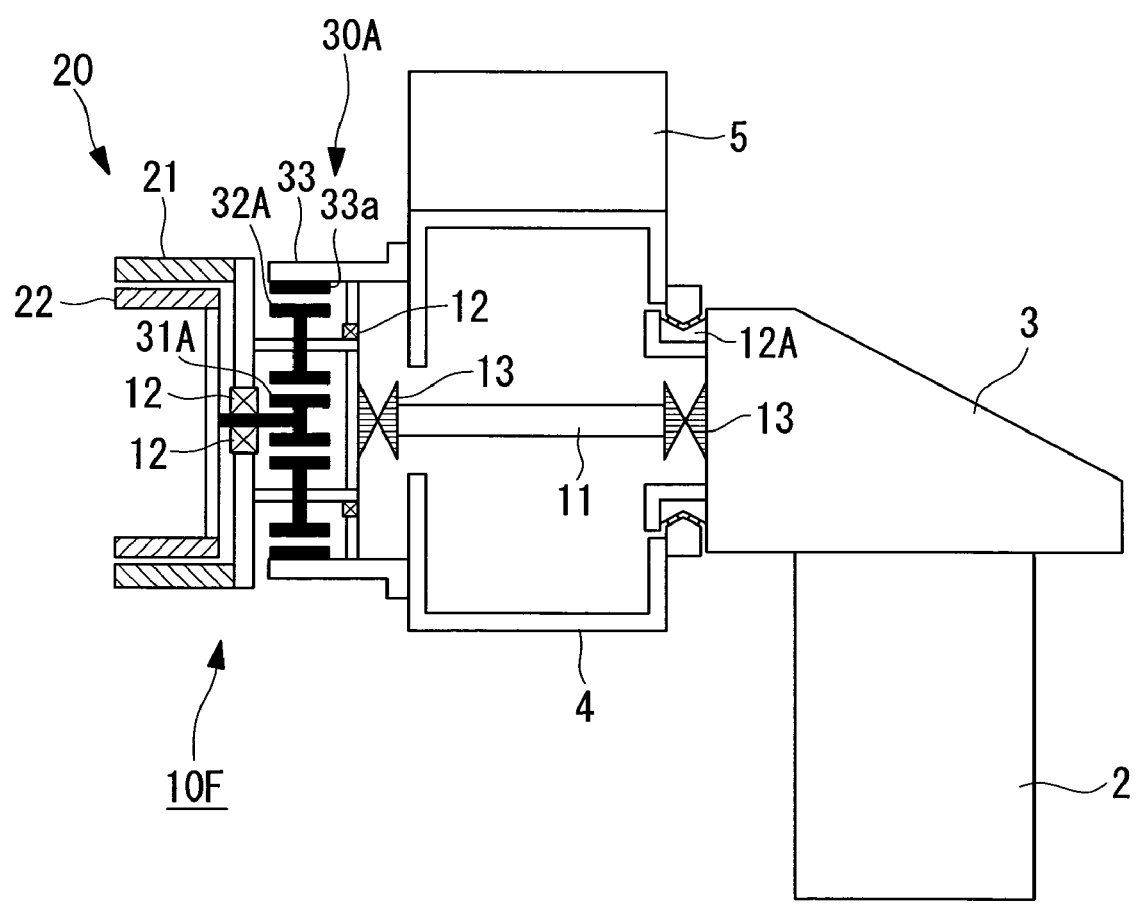
FIG. 12 is an enlarged cross-sectional view showing a relevant part of an example of the internal configuration of the nacelle and its surrounding area as a seventh embodiment of the wind turbine generator according to the present invention.
Figure 13:
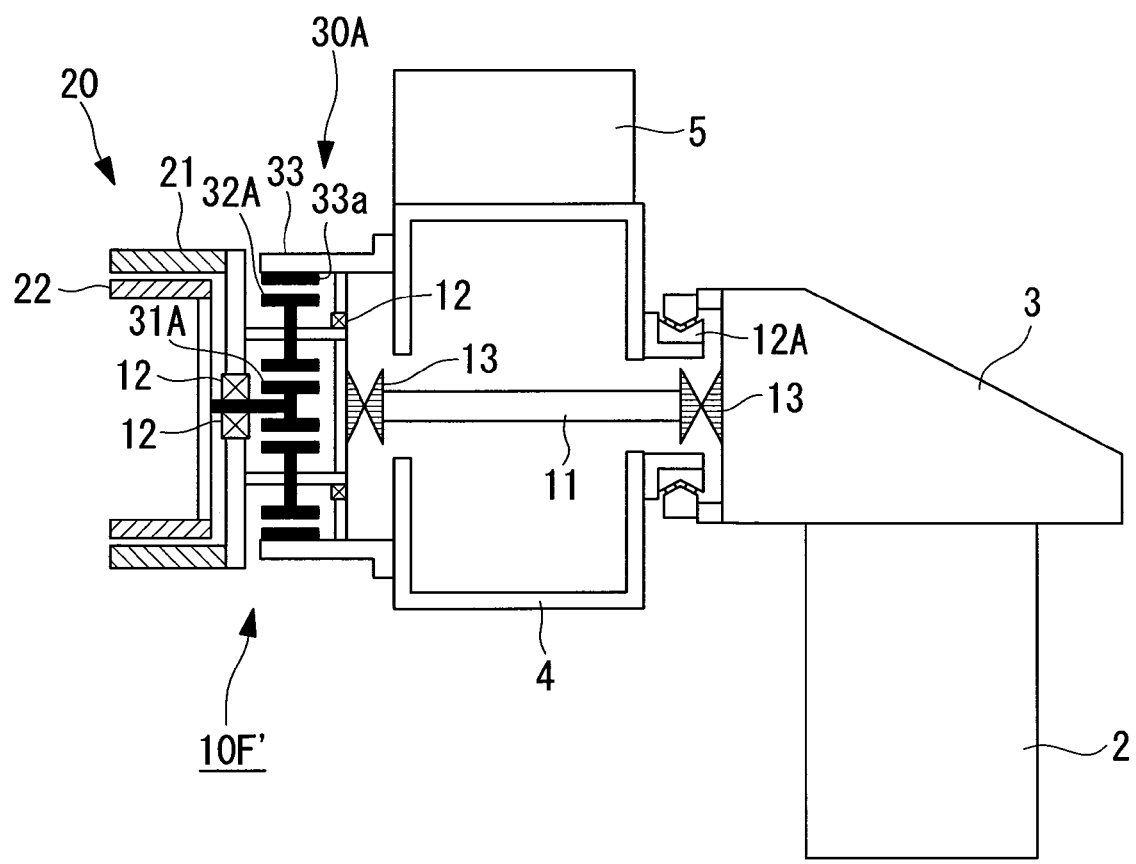
FIG. 13 is a cross-sectional view showing a first modification of the seventh embodiment.

A configuration shown in FIG. 13 corresponds to a first modification of FIG. 12. Specifically, the support relationship between the nacelle 3 and the rotor head 4 is modified. FIG. 12 corresponds to an outer-race rotation type in which the rotor head 4 rotates around the outer periphery of a bearing 12A, whereas FIG. 13 corresponds to an inner-race rotation type in which the rotor head 4 rotates within the inner periphery of the bearing 12A. In this first modification, the use of a multi-type generator in place of the generator 20 is also possible.

Figure 14:
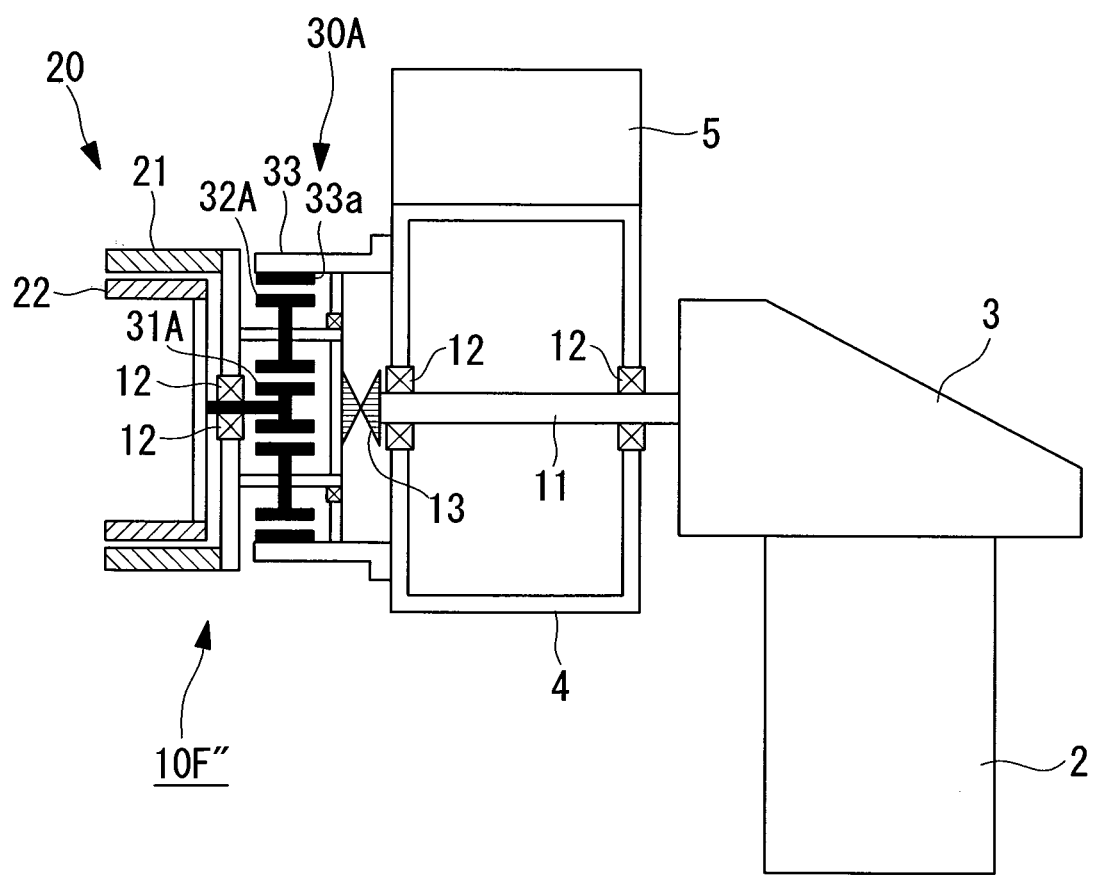
FIG. 14 is a cross-sectional view showing a second modification of the seventh embodiment.

A configuration shown in FIG. 14 corresponds to a second modification of FIG. 12. Specifically, the rotor head 4 may be supported by the main shaft 11 via bearings 12 as a rotary support structure therefor, and a drive train 10F" having a single-stage flexible coupling 13 may be used. In this second modification, the use of a multi-type generator in place of the generator 20 is also possible.

Eighth Embodiment

Next, an eighth embodiment of the wind turbine generator according to the present invention will be described with reference to FIG. 15. Components similar to those in the above embodiments will be given the same reference numerals, and detailed descriptions thereof will be omitted.

A drive train 10G in this embodiment is equipped with a speed-increasing gearbox 30B between the rotor head 4 and the generator 20 for increasing the speed of rotation of the rotor head 4 and transmitting it to the generator 20. This speed-increasing gearbox 30B is a two-stage parallel speed-increasing gearbox, and reference numeral 31A denotes a driven gear, 32A and 32B denote driven gears, and 33a denotes a gear section formed on an inner peripheral surface of a casing 33A.

In this speed-increasing gearbox 30B, the casing 33A, which is directly fixed to the front face of the rotor head 4, rotates together therewith so as to rotate planet gears 32A meshed with the gear section 33a. The planet gears 32A are rotatably supported by a casing member 33B, which is securely supported by the end of the main shaft 11 with a flexible coupling 13 therebetween, via bearings 12.

Furthermore, the planet gears 32A are coaxially connected to the planet gears 32B having a larger diameter. These planet gears 32B are meshed with the sun gear 31A which is coaxial with the rotor 22. Therefore, the rotation of the rotor head 4 causes the rotor 22 to rotate at a speed increased in accordance with the gear ratio between the gear section 33a, the planet gears 32A and 32B, and the sun gear 31A. Specifically, in this case, because the rotor 22 rotating together with the sun gear 31A rotates within the stator 21 substantially coaxially therewith, the generator 20 generates electricity on the basis of the law of electromagnetic induction. In this embodiment, the use of a multi-type generator in place of the generator 20 is also possible.

Figure 15:
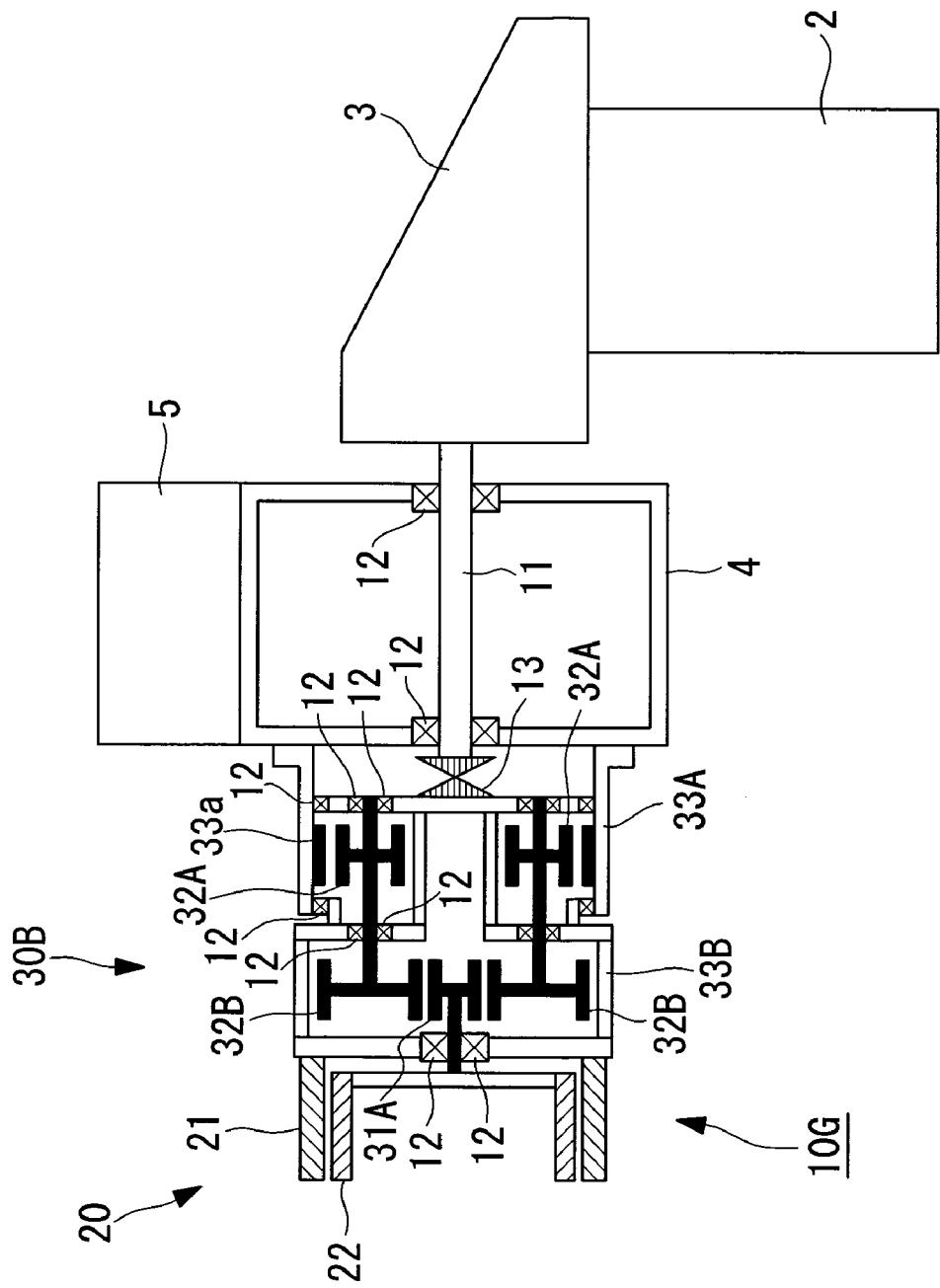
FIG. 15 is an enlarged cross-sectional view showing a relevant part of an example of the internal configuration of the nacelle and its surrounding area as an eighth embodiment of the wind turbine generator according to the present invention.
Figure 16:
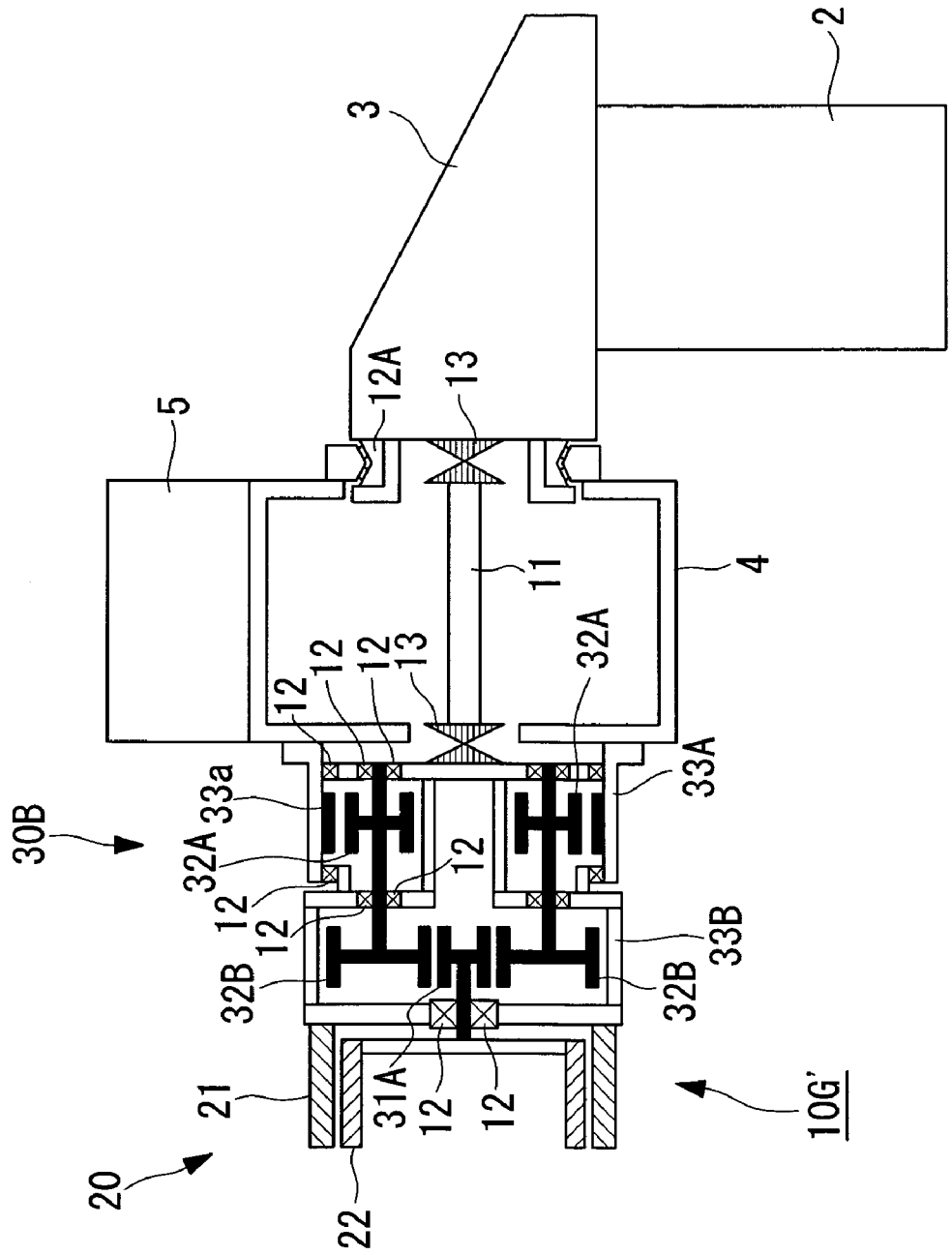
FIG. 16 is a cross-sectional view showing a first modification of the eighth embodiment.
Figure 17:
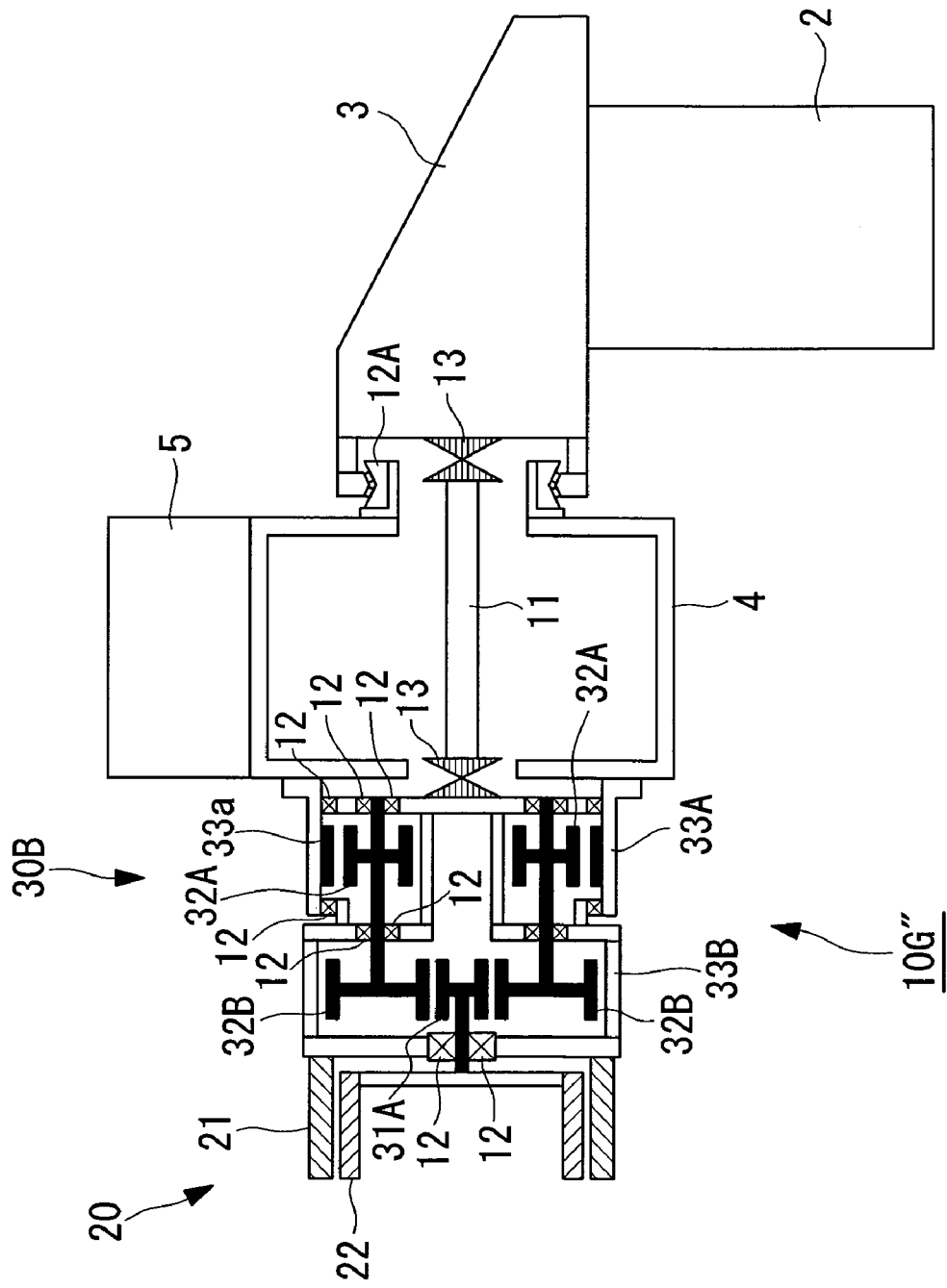
FIG. 17 is a cross-sectional view showing a second modification of the eighth embodiment.

A configuration shown in FIG. 16 corresponds to a first modification of FIG. 15, and a configuration shown in FIG. 17 corresponds to a second modification of FIG. 15. Specifically, the support relationship between the nacelle 3 and the rotor head 4 is modified. FIG. 16 corresponds to an outer-race rotation type in which the rotor head 4 rotates around the outer periphery of a bearing 12A, whereas FIG. 17 corresponds to an inner-race rotation type in which the rotor head 4 rotates within the inner periphery of the bearing 12A. The remaining configuration is the same as that in the embodiment shown in FIG. 15. In the first modification and the second modification, the use of a multi-type generator in place of the generator 20 is also possible.

Ninth Embodiment

Next, a ninth embodiment of the wind turbine generator according to the present invention will be described with reference to FIG. 18. Components similar to those in the above embodiments will be given the same reference numerals, and detailed descriptions thereof will be omitted.

Figure 10:
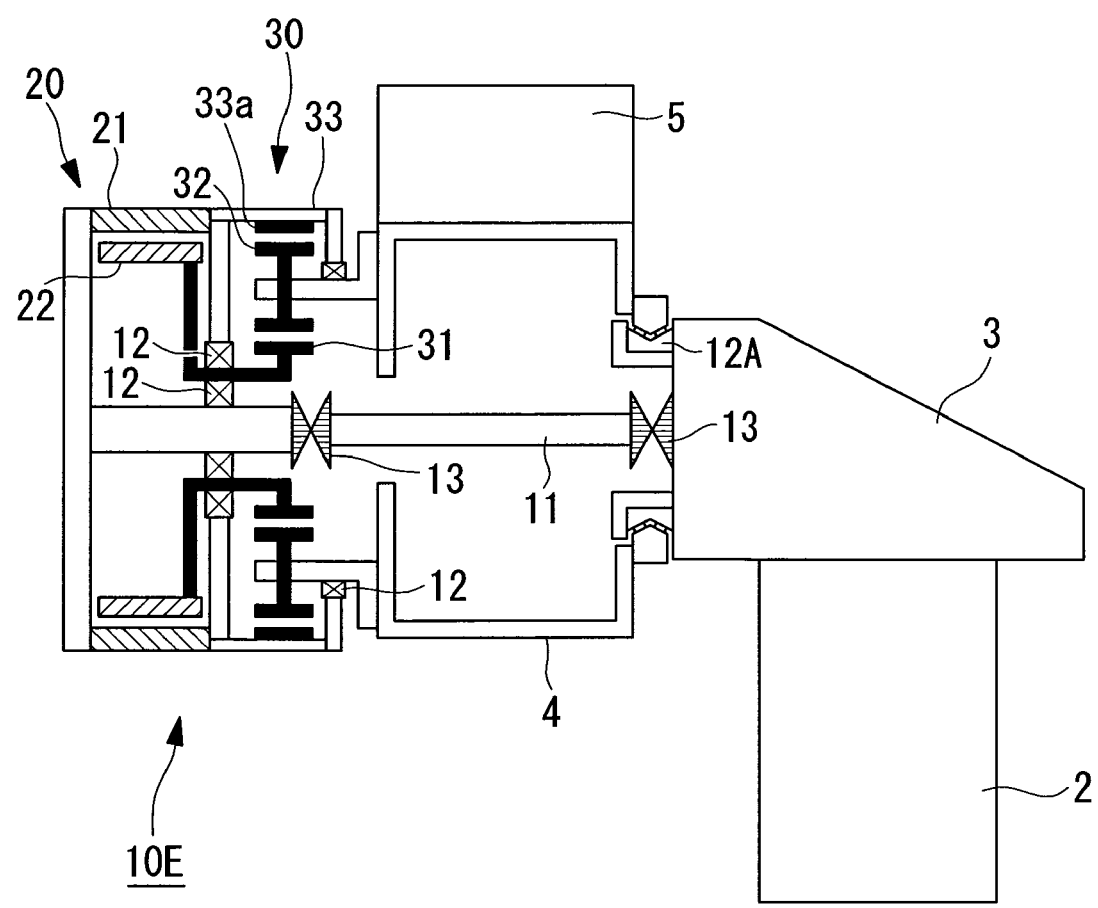
FIG. 10 is an enlarged cross-sectional view showing a relevant part of an example of the internal configuration of the nacelle and its surrounding area as a sixth embodiment of the wind turbine generator according to the present invention.

A drive train 10H in this embodiment employs a speed-increasing gearbox 30C, which is equivalent to two stages of speed-increasing gearboxes 30 in the sixth embodiment shown in FIG. 10, and also employs a multi-type generator 40 that drives small-size generators using a plurality of output shafts corresponding to the two stages. This multi-type generator 40 is constituted by a combination of a plurality of small-size, low-output mini-generators 41. Similar to the generator 20 described above, the mini-generators 41 shown in the drawing generate electricity by causing rotors 22 to rotate within stators 21.

The speed-increasing gearbox 30C in this case is a two-stage speed-increasing gearbox equivalent to a combination of the single-stage planetary speed-increasing gearbox 30 shown in FIG. 10 and spur gears. The speed-increasing gearbox 30C is made into a two-stage speed-increasing type by joining spur gears to an output shaft of the sun gear 31, and is configured to rotate a first gear 35 of the external gear together with the sun gear 31 and to speed up and rotate second gears 36 of the external gear, which are arranged around the outer periphery of the first gear 35 and are meshed therewith. Specifically, the multiple second gears 36 having a smaller number of teeth than the first gear 35 are arranged at an equal pitch in the circumferential direction, and the rotor 22 of each mini-generator 41 is attached to an output shaft of the corresponding each second gear 36. Although the second gears 36 are arranged at an equal pitch in the example shown in the drawing, they do not necessarily need to be arranged at an equal pitch.

With such a configuration, the rotation of the rotor head 4 is increased in speed in two stages by the speed-increasing gearbox 30C, and the rotor 22 of each mini-generator 41 is made to rotate within the stator 21, so that electricity is generated in each mini-generator 41 on the basis of the law of electromagnetic induction. The sum of the amounts of electricity generated in the individual mini-generators 41 is the total amount of electricity generated in the multi-type generator 40. Consequently, the mini-generators 41 can each be reduced in size and weight, thereby facilitating the maintenance process as well as the repair and replacement processes in the event of problems, such as failure, which all involve work at a high elevation. Since there is a low possibility that problems may occur simultaneously in all of the mini-generators 41, the overall operation of the wind turbine generator can be prevented from being terminated by simply stopping the electric power generation of the mini-generator 41 having a problem, even though this may somewhat lower the total amount of electricity generated.

Tenth Embodiment

Next, a tenth embodiment of the wind turbine generator according to the present invention will be described with reference to FIG. 19. Components similar to those in the above embodiments will be given the same reference numerals, and detailed descriptions thereof will be omitted.

A drive train 10I in this embodiment employs a speed-increasing gearbox 30D, which is equivalent to two stages of speed-increasing gearboxes 30A in the seventh embodiment shown in FIG. 12, and also employs a multi-type generator 40 that drives small-size generators using a plurality of output shafts corresponding to the two stages. This multi-type generator 40 is constituted by a combination of a plurality of small-size mini-generators 41. Similar to the generator 20 described above, the mini-generators 41 shown in the drawing generate electricity by causing rotors 22 to rotate within stators 21.

The speed-increasing gearbox 30D in this case is a two-stage speed-increasing gearbox equivalent to a combination of the single-stage star-type speed-increasing gearbox 30A shown in FIG. 12 and spur gears. The speed-increasing gearbox 30D is made into a two-stage speed-increasing type by joining spur gears to an output shaft of the sun gear 31A, and is configured to rotate a first gear 35 of the external gear together with the sun gear 31A and to speed up and rotate second gears 36 of the external gear, which are arranged around the outer periphery of the first gear 35 and are meshed therewith. Specifically, the multiple second gears 36 having a smaller number of teeth than the first gear 35 are arranged at an equal pitch in the circumferential direction, and the rotor 22 of each mini-generator 41 is attached to an output shaft of the corresponding each second gear 36.

With such a configuration, the rotation of the rotor head 4 is increased in speed in two stages by the speed-increasing gearbox 30D, and the rotor 22 of each mini-generator 41 is made to rotate within the stator 21, so that electricity is generated in each mini-generator 41 on the basis of the law of electromagnetic induction. The sum of the amounts of electricity generated in the individual mini-generators 41 is the total amount of electricity generated in the multi-type generator 40. Consequently, the mini-generators 41 can each be reduced in size and weight, thereby facilitating the maintenance process as well as the repair and replacement processes in the event of problems, such as failure, which all involve work at a high elevation. Since there is a low possibility that problems may occur simultaneously in all of the mini-generators 41, the overall operation of the wind turbine generator can be prevented from being terminated by simply stopping the electric power generation of the mini-generator 41 having a problem, even though this may somewhat lower the total amount of electricity generated.

Eleventh Embodiment

Next, an eleventh embodiment of the wind turbine generator according to the present invention will be described with reference to FIGS. 20A and 20B. Components similar to those in the above embodiments will be given the same reference numerals, and detailed descriptions thereof will be omitted.

A drive train 10J in this embodiment employs a speed-increasing gearbox 30E constituted by a combination of two stages of spur gears, and also employs a multi-type generator 40 that drives small-size generators using a plurality of output shafts corresponding to the two stages. This multi-type generator 40 is constituted by a combination of a plurality of small-size mini-generators 41. Similar to the generator 20 described above, the mini-generators 41 shown in the drawing generate electricity by causing rotors 22 to rotate within stators 21.

In the speed-increasing gearbox 30E in this case, a main driving gear 37 of the external gear, which rotates together with the rotor head 4, and plurality of the first driven gears 38, which are disposed at an equal pitch around the outer periphery of the main driving gear 37 and are meshed therewith, constitute a first-stage speed-increasing mechanism. The first driven gears 38 of the first-stage speed-increasing mechanism are individually provided with second driven gears 39A which are coaxial therewith, and third driven gears 39B are provided to mesh with the second driven gears 39A, thereby constituting a second-stage speed-increasing mechanism. Consequently, in the speed-increasing gearbox 30E, the rotation of the rotor head 4 that is increased in speed in two stages is output from rotary shafts of the third driven gears 39B, and the rotors 22 coaxially attached to the third driven gears 39B are rotated within the stators 21, whereby electricity can be generated by the mini-generators 41.

Although the first driven gears 38 are arranged at an equal pitch in the example shown in the drawings, they do not necessarily need to be arranged at an equal pitch.

With such a configuration, the rotation of the rotor head 4 is increased in speed in two stages by the speed-increasing gearbox 30E, and the rotor 22 of each mini-generator 41 is made to rotate within the stator 21, so that electricity is generated in each mini-generator 41 on the basis of the law of electromagnetic induction. The sum of the amounts of electricity generated in the individual mini-generators 41 is the total amount of electricity generated in the multi-type generator 40. Consequently, the mini-generators 41 can each be reduced in size and weight, thereby facilitating the maintenance process as well as the repair and replacement processes in the event of problems, such as failure, which all involve work at a high elevation. Since there is a low possibility that problems may occur simultaneously in all of the mini-generators 41, the overall operation of the wind turbine generator can be prevented from being terminated by simply stopping the electric power generation of the mini-generator 41 having a problem, even though this may somewhat lower the total amount of electricity generated.

Figure 20A:
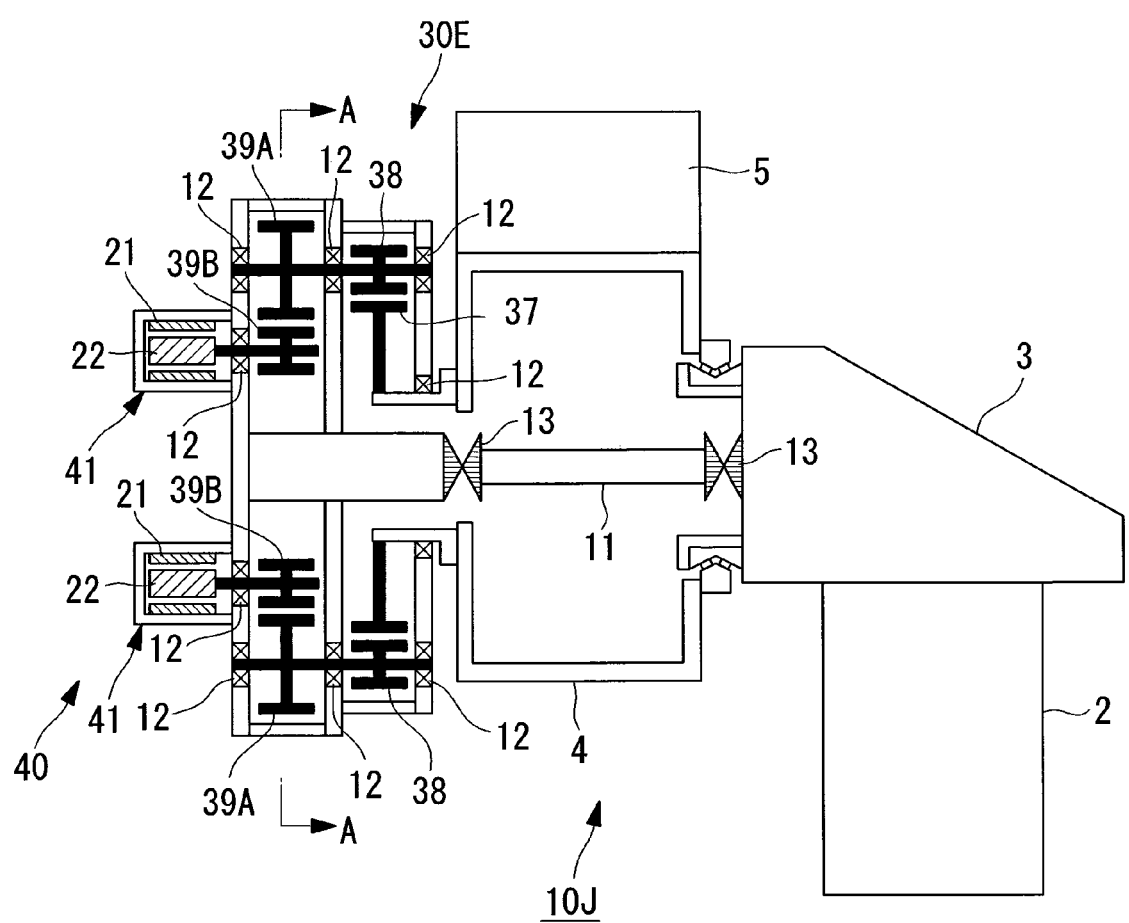
FIG. 20A is an enlarged cross-sectional view showing a relevant part of an example of the internal configuration of the nacelle and its surrounding area as an eleventh embodiment of the wind turbine generator according to the present invention.

As shown in FIG. 20A, the aforementioned third driven gears 39B are arranged within the second driven gears 39A, that is, closer to the main shaft 11. The arrangement of the third driven gears 39B at this position is suitable for a compact configuration since the overall outside diameter is not determined by the mini-generators 41. However, depending on, for example, the shape of the mini-generators 41 coaxial therewith, it is conceivable that they cannot be arranged in this manner because the mini-generators 41 interfere with each other.

Figure 20B:
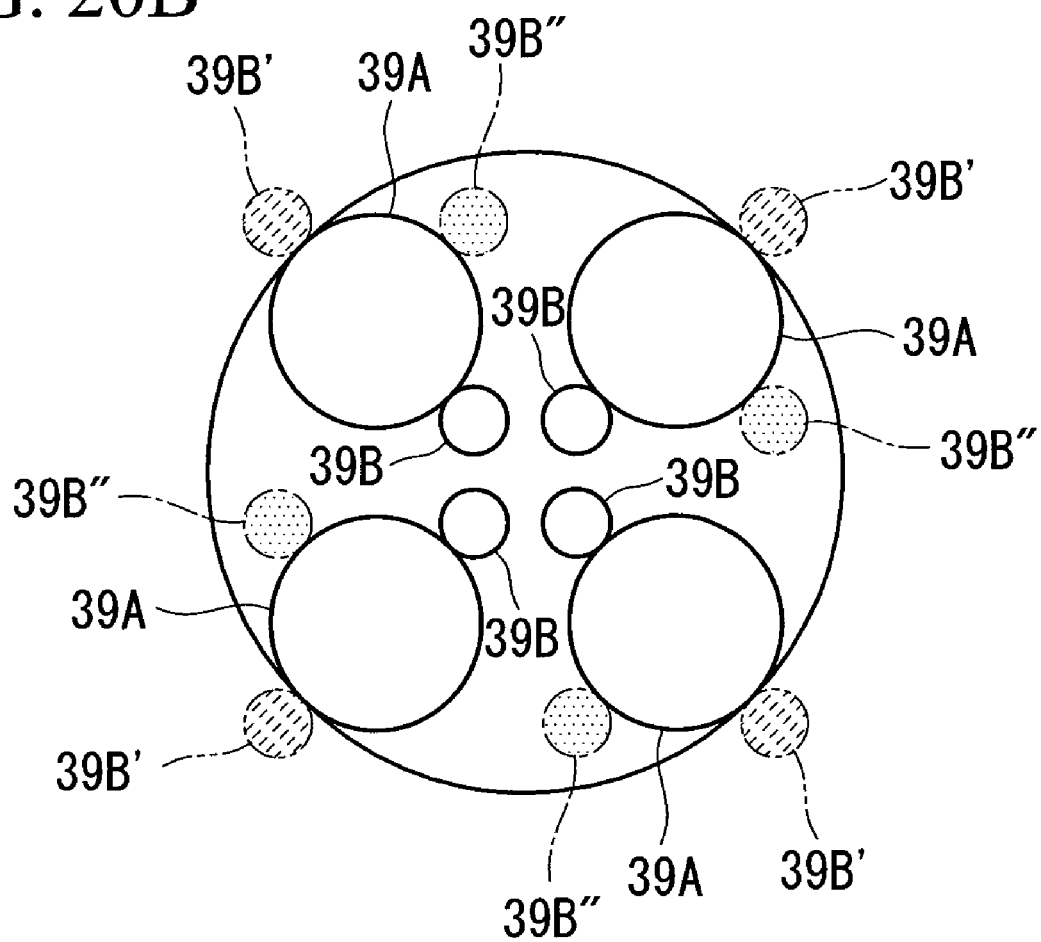
FIG. 20B is a cross-sectional view taken along line A-A in FIG. 20A.

In light of this, with regard to the positional relationship between the third driven gears 39B and the second driven gears 39A, the following modifications are possible in the arrangement (meshing) direction, as shown in FIG. 20B.

In an arrangement example of a first modification, third driven gears 39B' may be arranged on the outermost peripheral side of the speed-increasing gearbox 30E and be meshed with the second driven gears 39A, as shown with a two-dot chain line in FIG. 20B. When such an arrangement is employed, even though the mini-generators 41 can be prevented from interfering with each other, the outside diameters of the drive train 10J and the speed-increasing gearbox 30E are determined on the basis of the outer peripheral position of the mini-generators 41. For this reason, there is concern that the outside diameter of the entire device may increase.

In an arrangement example of a second modification, third driven gears 39B" may each be arranged at an intermediate position between the aforementioned third driven gears 39B and 39B', that is, at a position shifted by about 90 degrees in the circumferential direction of the corresponding second driven gear 39A, and be meshed with the second driven gear 39A, as shown with a single-dot chain line in FIG. 20B. When such an arrangement is employed, a configuration that allows for both compactness and prevention of interference between the mini-generators 41 can be achieved.

Accordingly, with regard to the position of the third driven gears 39B, 39B', and 39B", an optimal position may be appropriately selected, including intermediate positions between the two modifications, depending on various conditions.

Twelfth Embodiment

Figure 21:
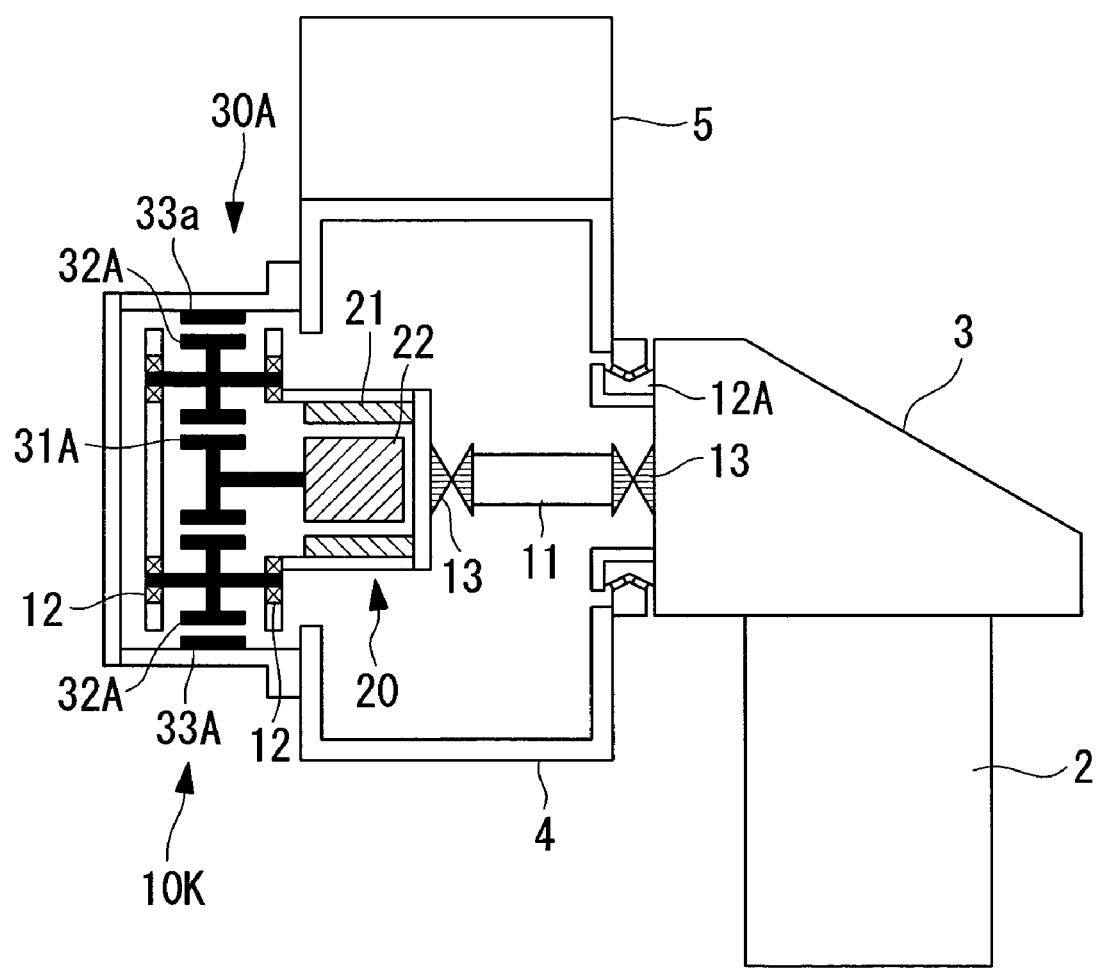
FIG. 21 is an enlarged cross-sectional view showing a relevant part of an example of the internal configuration of the nacelle and its surrounding area as a twelfth embodiment of the wind turbine generator according to the present invention.

Next, a twelfth embodiment of the wind turbine generator according to the present invention will be described with reference to FIG. 21. Components similar to those in the above embodiments will be given the same reference numerals, and detailed descriptions thereof will be omitted.

A drive train 10K in this embodiment is equipped with a speed-increasing gearbox 30A and a generator 20 for increasing the speed of rotation of the rotor head 4 and transmitting it to the generator 20. In this case, the speed-increasing gearbox 30A is a single-stage star-type speed-increasing gearbox, and reference numeral 31A in the drawing denotes a sun gear and 32A denotes planet gears. The planet gears 32A in the star-type speed-increasing gearbox 30A are rotatable by being supported by the main shaft 11 at the fixed side, and are meshed with a gear section 33a at the outer peripheral side, which is formed on an inner peripheral surface of a casing 33A that rotates together with the rotor head 4.

In the drive train 10K, the generator 20 is disposed closer to the nacelle 3 relative to the speed-increasing gearbox 30A. Specifically, the order of arrangement in the axial direction is inverted relative to that in the drive train in each of the above embodiments, such that the generator 20 is disposed closer to the nacelle 3, whereas the speed-increasing gearbox 30A is disposed closer to the end. In the configuration example shown in the drawing, at least a part of the generator 20 is positioned inside the rotor head 4 so that the center of gravity of the drive train 10K is located closer towards the nacelle 3 (towards a bearing 12A serving as a main bearing).

Figure 22:
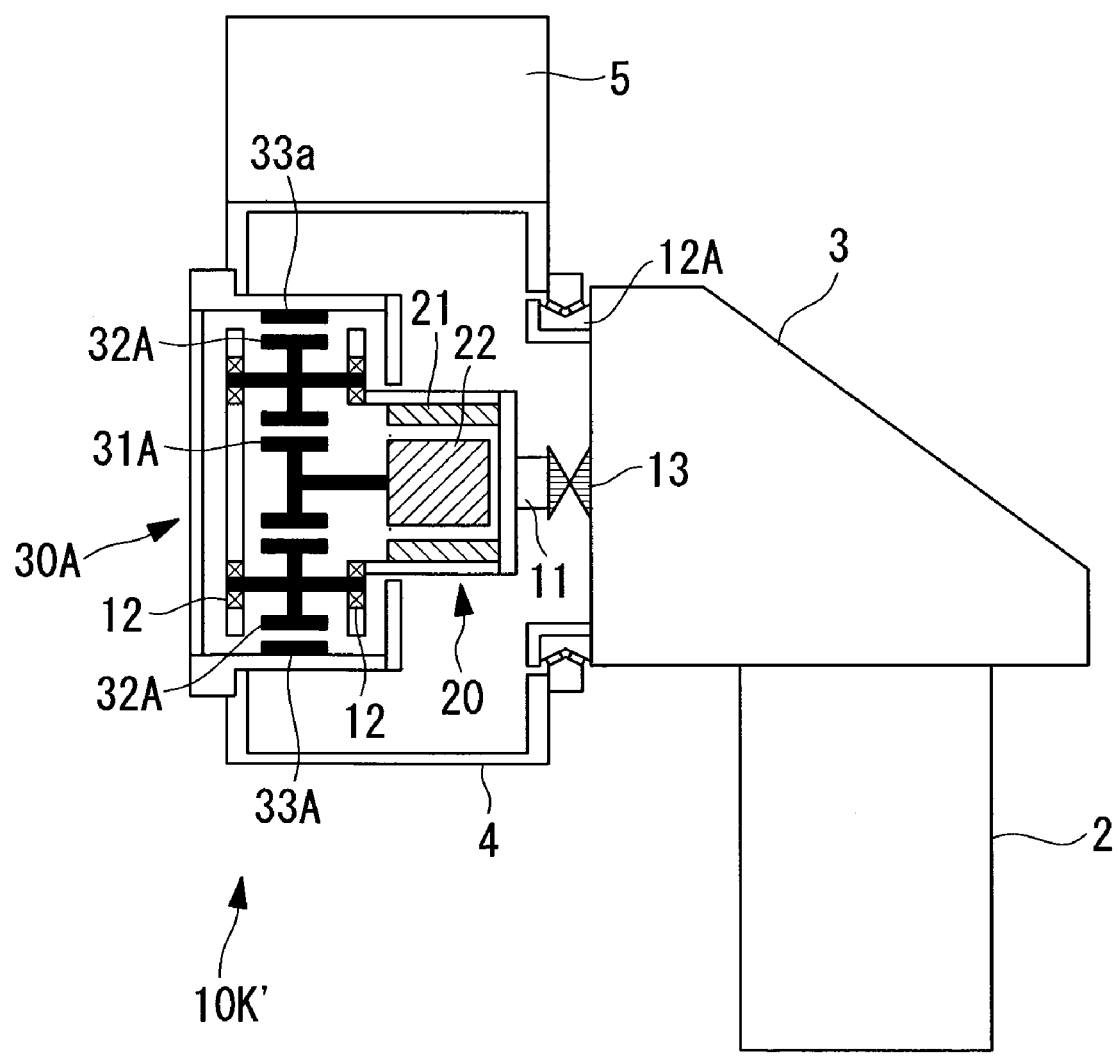
FIG. 22 is a cross-sectional view showing a first modification of the twelfth embodiment.

In a drive train 10K' of a first modification shown in FIG. 22, the generator 20 and a part of the speed-increasing gearbox 30A are disposed inside the rotor head 4, in addition to the generator 20 being disposed closer to the nacelle 3 relative to the speed-increasing gearbox 30A. In other words, in the configuration of the first modification, the center of gravity of the drive train 10K' is located even closer towards the nacelle 3 by shifting the drive train 10K in the embodiment shown in FIG. 21 as close to the nacelle 3 as possible and disposing the entire generator 20 and a major part of the speed-increasing gearbox 30A inside the rotor head 4.

Consequently, in the aforementioned drive trains 10K and 10K', the casing 33A rotates at the same speed as the rotor head 4, and the speed of the sun gear 31A is increased in accordance with the gear ratio between the gear section 33a of the casing 33A, the planet gears 32A, and the sun gear 31A. In this case, since the rotor 22 is coaxial with the sun gear 31A, the generator 20 in this embodiment is similarly configured to generate electricity by causing electromagnetic induction to occur between the stator 21 and the rotor 22 rotating at a speed accelerate by the rotation speed of the rotor head 4.

In the drive trains 10K and 10K' having these configurations, since the generator 20 is disposed closer to the nacelle 3 relative to the speed-increasing gearbox 30A and has at least a part that is disposed inside the rotor head 4, the center of gravity of the drive train itself can be located closer towards the nacelle 3.

Therefore, the moment acting on the bearing 12A can be reduced, and the support structure can be reduced in weight. In other words, the load on the nacelle 3 supporting the bearing 12A can be reduced, and the structure of the nacelle 3 can be simplified and reduced in weight by an amount equivalent to the reduced load. With regard to the drive trains 10K and 10K', the main shaft 11 can be made shorter so as to allow for a lightweight compact structure.

When the rotor-head cover is removed for performing maintenance or replacing devices in the drive train 10K or 10K', the speed-increasing gearbox 30A is located at the end. Since the speed-increasing gearbox 30A may require more frequent maintenance and has a higher possibility of replacement of devices as compared with the generator 20, the arrangement that allows work to be performed while keeping the generator 20 unchanged is advantageous in that it improves the work efficiency of maintenance and the like.

Figure 23:
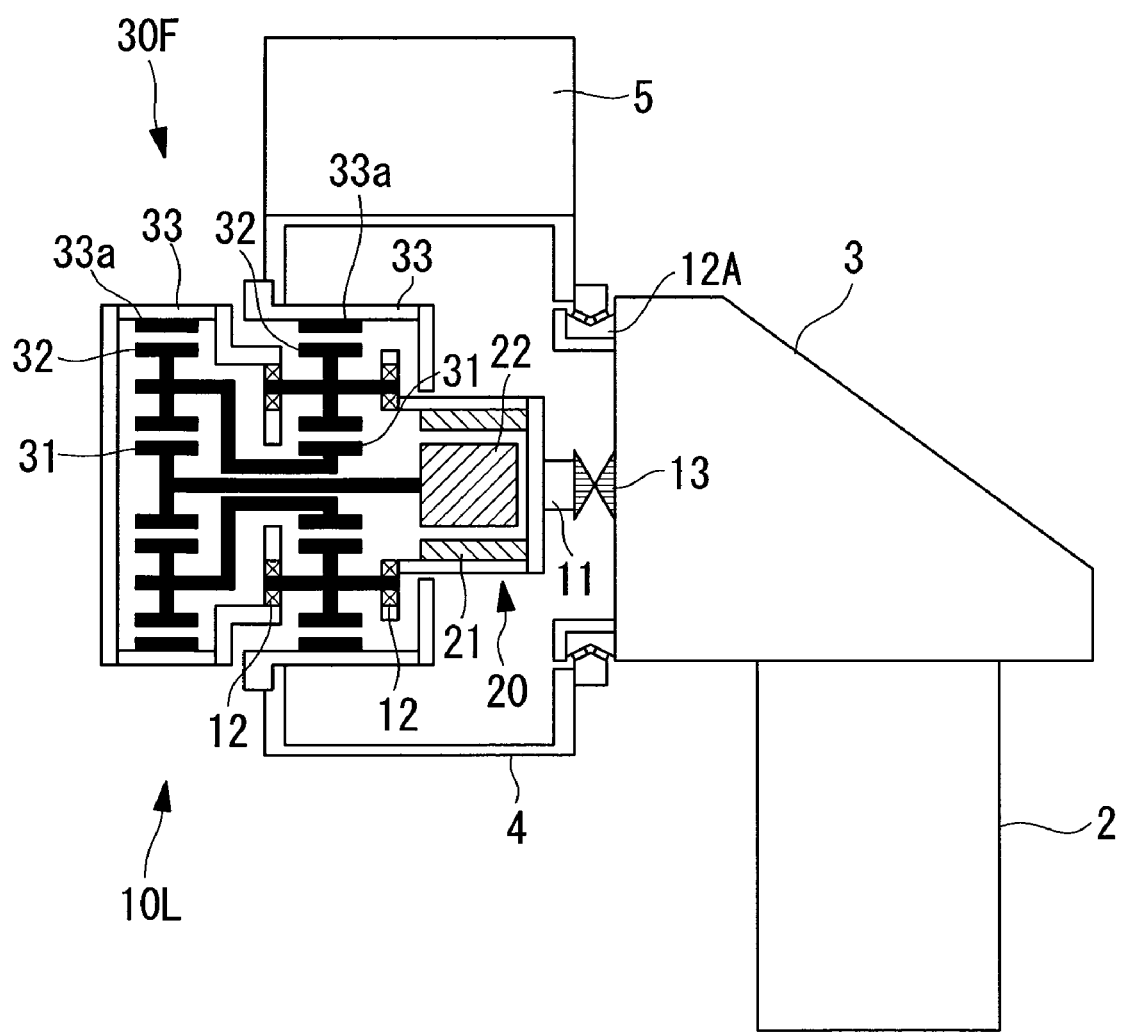
FIG. 23 is a cross-sectional view showing a second modification of the twelfth embodiment.
Figure 24:
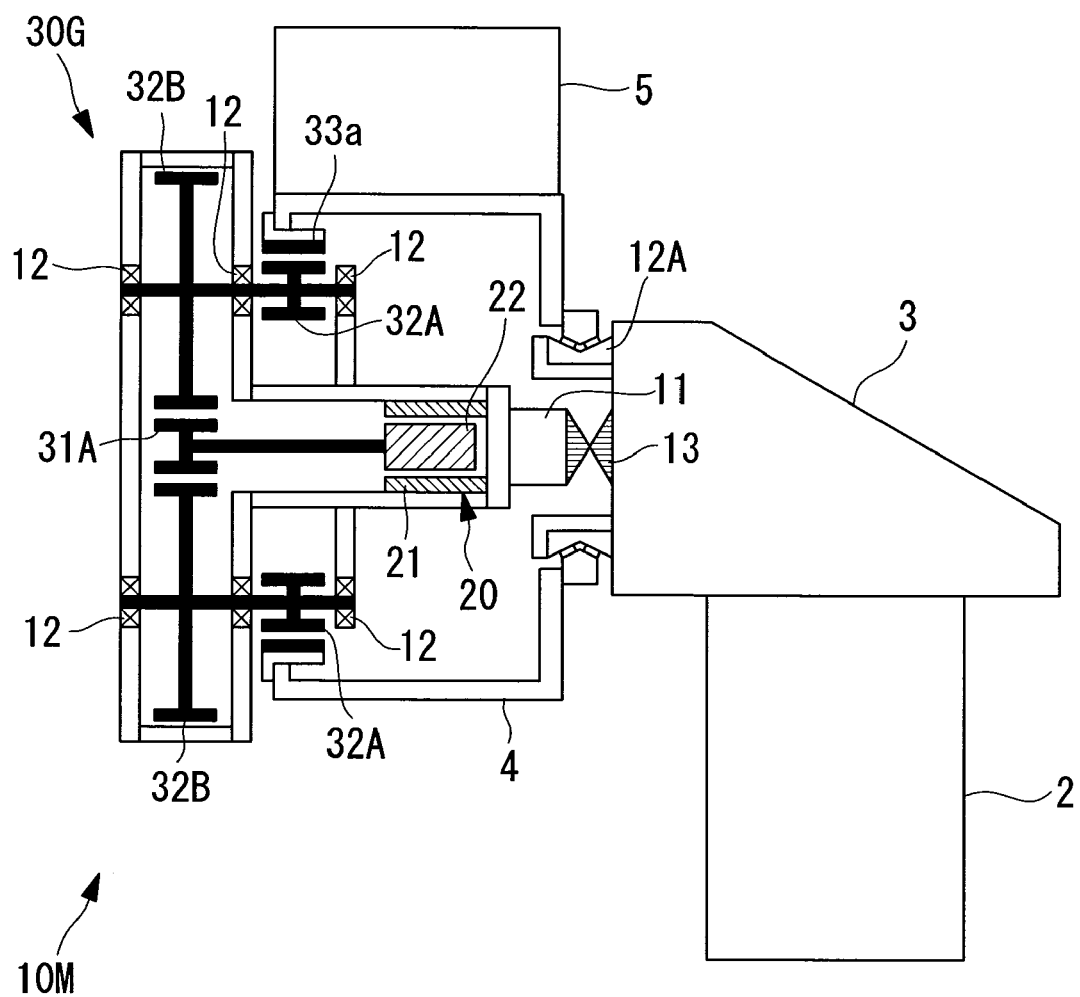
FIG. 24 is a cross-sectional view showing a third modification of the twelfth embodiment.

The configuration in which the generator 20 is disposed closer to the nacelle 3 relative to the speed-increasing gearbox 30A, as in the drive trains 10K and 10K', may alternatively employ, for example, a speed-increasing gearbox 30F in a second modification shown in FIG. 23 or a speed-increasing gearbox 30G in a third modification shown in FIG. 24, and has no limitations in terms of the combination of the speed-increasing gearbox and the generator. In FIGS. 23 and 24, components similar to those in the above embodiments will be given the same reference numerals, and detailed descriptions thereof will be omitted.

In the second modification shown in FIG. 23, a drive train 10L equipped with a two-stage speed-increasing gearbox 30F of star and planetary types is employed. In this case, the generator 20 and about half of the speed-increasing gearbox 30F are disposed within the rotor head 4 so that the center of gravity is located closer towards the nacelle 3, thereby allowing for weight reduction and compactness. Furthermore, in this drive train 10L, since the speed-increasing gearbox 30F is positioned at the end, the work efficiency of maintenance and the like is satisfactory.

In the third modification shown in FIG. 24, a drive train 10M equipped with a speed-increasing gearbox 30G constituted by a combination of two stages of spur gears is employed. In this case, the generator 20 and about half of the speed-increasing gearbox 30G are similarly disposed within the rotor head 4 so that the center of gravity is located closer towards the nacelle 3, thereby allowing for weight reduction and compactness. Furthermore, in this drive train 10M, since the speed-increasing gearbox 30G is positioned at the end, the work efficiency of maintenance and the like is satisfactory.

Thirteenth Embodiment

Figure 25:
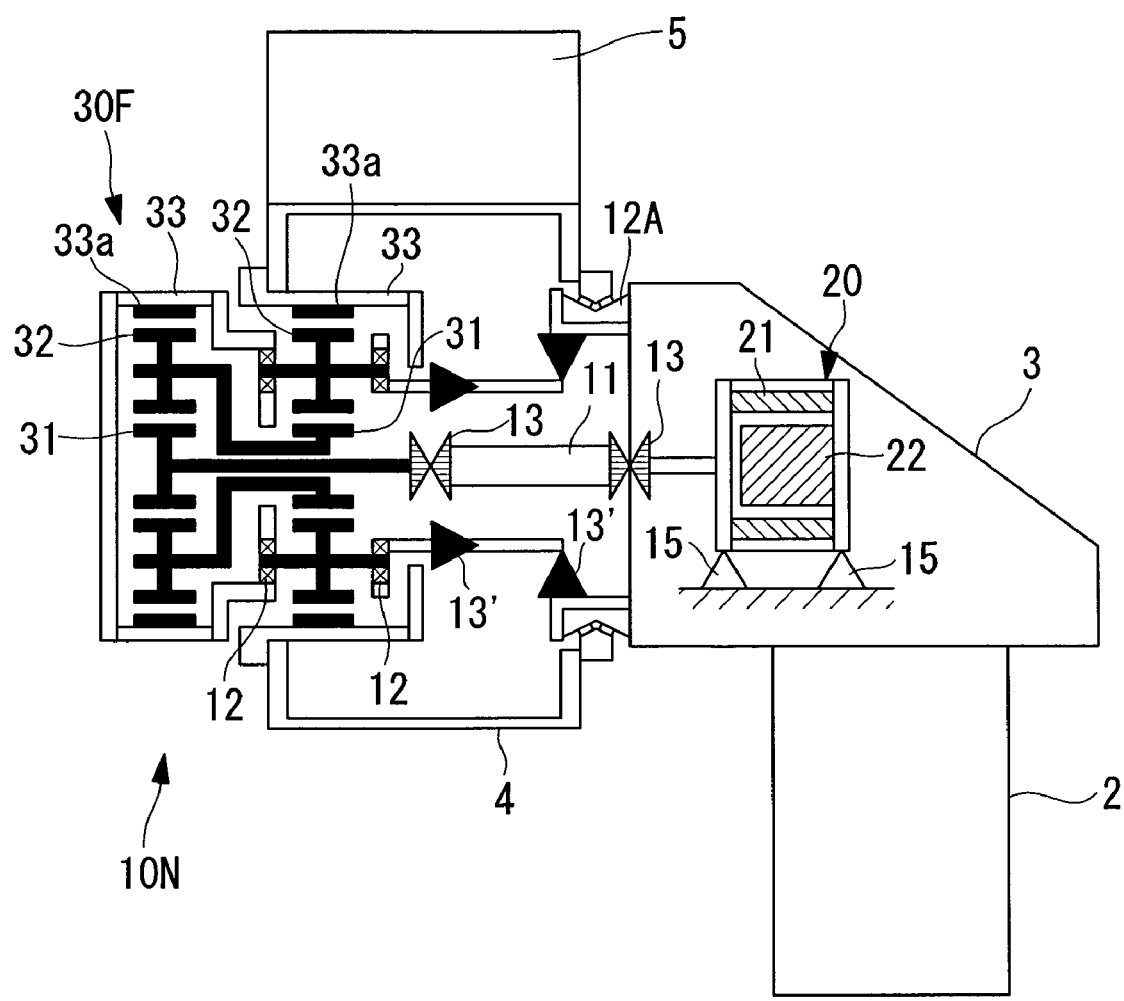
FIG. 25 is an enlarged cross-sectional view showing a relevant part of an example of the internal configuration of the nacelle and its surrounding area as a thirteenth embodiment of the wind turbine generator according to the present invention.

Next, a thirteenth embodiment of the wind turbine generator according to the present invention will be described with reference to FIG. 25. Components similar to those in the above embodiments will be given the same reference numerals, and detailed descriptions thereof will be omitted.

A drive train 10N in this embodiment is equipped with a speed-increasing gearbox 30F and a generator 20 for increasing the speed of rotation of the rotor head 4 and transmitting it to the generator 20. In this case, the speed-increasing gearbox 30F is a two-stage speed-increasing gearbox of star and planetary types having the same configuration as that in the second modification of the aforementioned twelfth embodiment (see FIG. 23), and about half of the speed-increasing gearbox 30F is disposed within the rotor head 4. In contrast, the generator 20 is entirely disposed inside the nacelle 3 by being rigidly supported by a support base 15 or flexibly supported by rubber vibration isolator or the like.

In this drive train 10N, the main shaft 11 having flexible couplings 13 at both ends thereof connect between an output shaft of the speed-increasing gearbox 30F and the rotor 22 of the generator 20 disposed within the nacelle 3. Reference numeral 13' in the drawing denotes torque-arm bushes interposed between the nacelle 3 and the speed-increasing gearbox 30F, but the aforementioned flexible couplings 13 may be used in place of the torque-arm bushes 13'.

With such a configuration, since the entire generator 20 is disposed within the nacelle 3 and about half of the speed-increasing gearbox 30F is disposed within the rotor head 4, the center of gravity of the drive train 10N is located even closer towards the nacelle 3, thereby readily allowing for weight reduction and compactness. Furthermore, in this drive train 10N, since the speed-increasing gearbox 30F is positioned at the end, the work efficiency of maintenance and the like is satisfactory.

According to the present invention described above, the drive train 10 or 10A-10N that transmits torque from the rotor head 4 to the generator 20 or the mini-generators 41 is disposed on the side of the rotor head 4 opposite the nacelle, that is, in front of the nacelle 3 in the aforementioned upwind type, so that a space that needs to be ensured within the nacelle 3 for the purpose of maintenance or the like but is unnecessary during normal operation can be reduced. In consequence, the nacelle 3 can be reduced in size. Furthermore, the nacelle bedplate can be reduced in size and weight even if the wind turbine generator 1 is increased in size.

Since the drive train 10 or 10A-10N is attached to the front side of the rotor head 4, the drive train 10, 10A-N overhangs forward when the rotor-head cover is removed. This facilitates the process of replacing the drive train and constituent devices thereof, which are placed at a high elevation, using a crane.

In particular, with the configurations of the drive trains 10K, 10K', 10L, 10M, and 10N in which the speed-increasing gearbox, which may require frequent maintenance, is disposed at the end, the work related to the speed-increasing gearbox, such as maintenance, can be performed while keeping the generator in its installed state, thereby achieving satisfactory work efficiency.

In each of the above embodiments, when taking into account a power source and a transmission structure for control signals, etc. required between the movable side and the stationary side, a configuration that uses flexible couplings 13 (e.g., see FIGS. 8, 10, 18, and 19) is advantageous in that it facilitates the arrangement of a slip ring.

Figure 18:
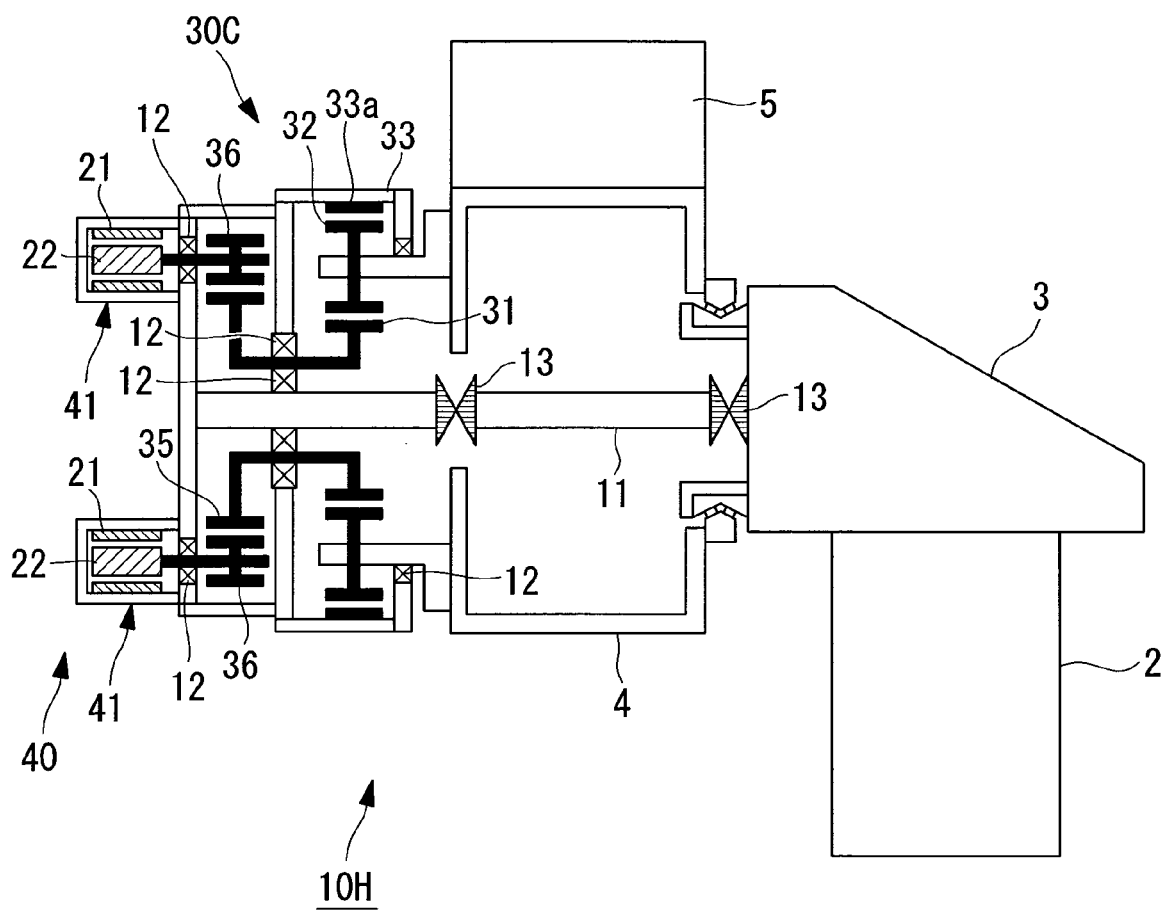
FIG. 18 is an enlarged cross-sectional view showing a relevant part of an example of the internal configuration of the nacelle and its surrounding area as a ninth embodiment of the wind turbine generator according to the present invention.
Figure 19:
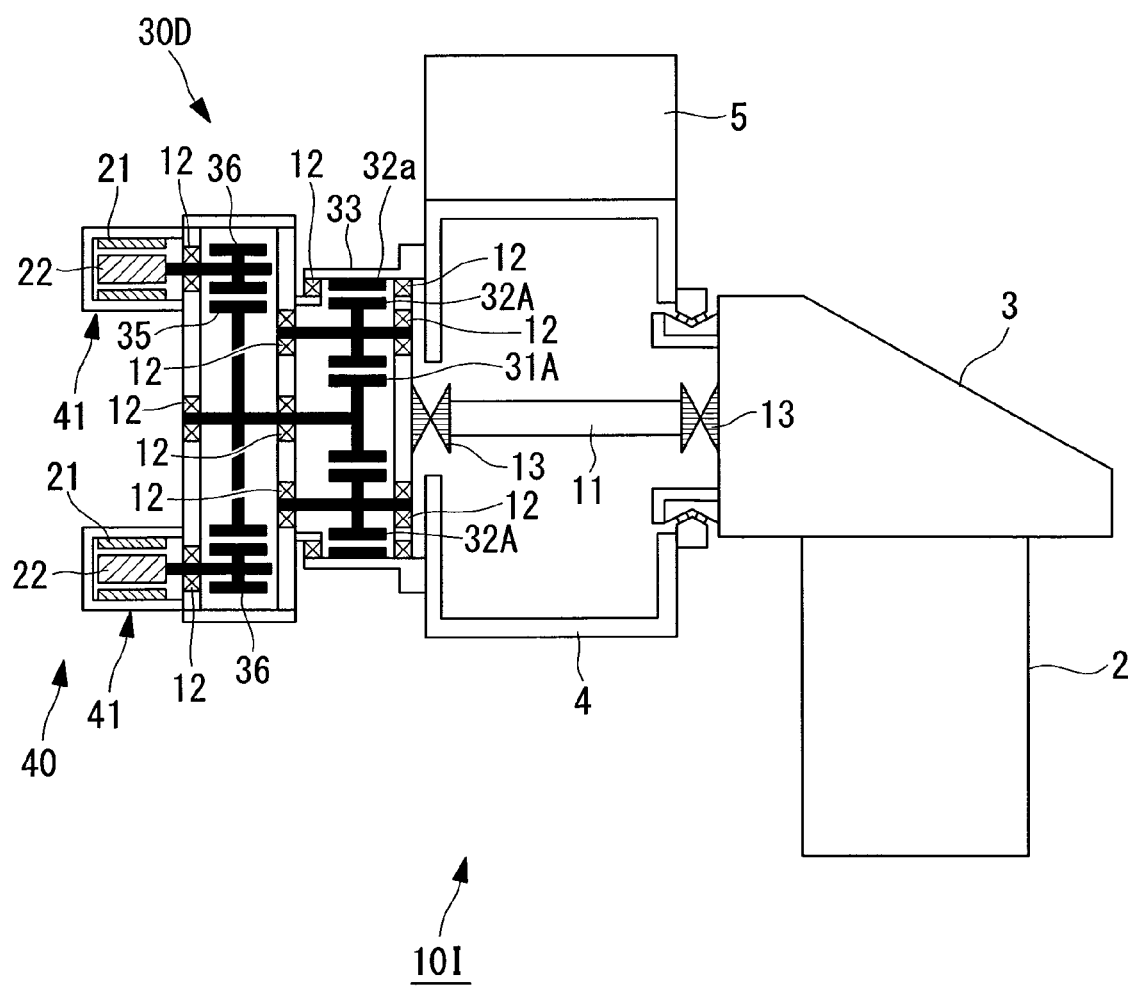
FIG. 19 is an enlarged cross-sectional view showing a relevant part of an example of the internal configuration of the nacelle and its surrounding area as a tenth embodiment of the wind turbine generator according to the present invention.

In view of size and weight reduction, a configuration that employs a multi-type generator 40 is advantageous; in general, a configuration having a combination of a two-stage speed-increasing gearbox and a multi-type generator 40, as shown in FIGS. 18 and 19, is especially advantageous.

With regard to gears having a large diameter, external gears can be manufactured more cheaply than internal gears.

Furthermore, in view of increasing the efficiency related to a load transmission path such as the main shaft 11, since the load is low, a configuration that allows for weight reduction by reducing the diameter thereof, as shown in, for example, FIGS. 18 and 19, is preferable.

Consequently, since the ninth embodiment shown in FIG. 18 and the tenth embodiment shown in FIG. 19 have an advantageous configuration for increasing the efficiency of the load transmission path in addition to a configuration that uses the aforementioned flexible couplings 13, the multi-type generator 40, and the external gears, they fulfill substantially all of conditions advantageous for achieving size and weight reduction.

Although the above embodiments are described with reference to an upwind wind turbine generator, the embodiments are also applicable to a downwind type.

In the case of a downwind type, the drive train is disposed behind the nacelle 3, and advantages similar to those of the aforementioned upwind type can be achieved.

When the speed-increasing gearbox is disposed closer to the nacelle, the components included in the speed-increasing gearbox and the generator constituting the drive train may partly be disposed inside the rotor head and/or the nacelle.

On the other hand, when the generator is disposed closer to the nacelle, it is preferable that the components included in the generator and the speed-increasing gearbox constituting the drive train be partly disposed inside the rotor head, or the entire generator may be disposed within the nacelle.

Specifically, the present invention includes a configuration in which the speed-increasing gearbox and/or the generator constituting the drive train is/are partly disposed within the rotor head and/or the nacelle. In other words, at least a part of the speed-increasing gearbox and/or the generator constituting the drive train may be disposed on the side of the rotor head opposite the nacelle.

The present invention is not limited to the above embodiments, and appropriate modifications, such as a modification in the combination related to, for example, the configuration of the speed-increasing gearbox and the configuration of the generator or a modification in the combination related to the bearings and the couplings, are permissible within a scope in which they do not depart from the spirit of the invention.

The invention claimed is:

1. A wind turbine generator, comprising:
   a rotor head having wind-turbine rotor blades attached thereto rotatable with said rotor head,
   a nacelle for supporting the said rotor head via a bearing,
   a main shaft securely supported by said nacelle, and protruding forward from said nacelle toward a side in a direction of said rotor head,
   a generator disposed outside said nacelle, said generator comprising a stator and a rotor,
   wherein said stator is supported by said main shaft, and
   wherein the main shaft penetrates the rotor head, and the stator and the rotor of said generator are disposed closer to an end side of the main shaft.

2. The wind turbine generator according to claim 1, wherein the rotor is supported by said rotor head.

3. The wind turbine generator according to claim 1, wherein the rotor receives rotative power of the rotor head via a speed-increasing gearbox.

4. The wind turbine generator according to claim 3, wherein the speed-increasing gearbox is disposed between said rotor head and said generator.

5. The wind turbine generator according to claim 1, wherein at least one of the stator and the rotor is supported via coupling.

6. The wind turbine generator according to claim 1, wherein the generator of the drive train includes a plurality of generators.

* * * * *